(12) United States Patent
Shaio et al.

(10) Patent No.: US 6,625,156 B2
(45) Date of Patent: *Sep. 23, 2003

(54) METHOD OF IMPLEMENTING QUALITY-OF-SERVICE DATA COMMUNICATIONS OVER A SHORT-CUT PATH THROUGH A ROUTED NETWORK

(75) Inventors: Jack Shaio, Winchester, MA (US); Rahul Kasralikar, Santa Clara, CA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,080

(22) Filed: Jun. 29, 1998

(65) Prior Publication Data

US 2003/0076838 A1 Apr. 24, 2003

(51) Int. Cl.[7] .......................... H04L 12/28; H04L 12/46
(52) U.S. Cl. .................. 370/395.21; 370/351; 370/389; 370/395.1; 370/395.2; 370/395.5; 370/905
(58) Field of Search ................................. 370/355, 231, 370/351, 360, 389, 229, 230, 357, 395.1, 395.2, 395.21, 395.5, 395.52, 905; 379/111, 133

(56) References Cited

U.S. PATENT DOCUMENTS

| | | | | |
|---|---|---|---|---|
| 5,732,078 A | * | 3/1998 | Arango | 370/355 |
| 5,825,772 A | * | 10/1998 | Dobbins et al. | 370/396 |
| 5,903,559 A | * | 5/1999 | Acharya et al. | 370/355 |
| 5,905,872 A | * | 5/1999 | DeSimone et al. | 395/200.75 |
| 6,009,097 A | * | 12/1999 | Han | 370/395 |
| 6,021,263 A | * | 2/2000 | Kujoory et al. | 395/200.62 |
| 6,085,238 A | * | 7/2000 | Yuasa et al. | 709/223 |
| 6,173,183 B1 | * | 1/2001 | Abu-Amara et al. | 455/442 |
| 6,279,035 B1 | * | 8/2001 | Brown et al. | 709/224 |

OTHER PUBLICATIONS

E. Guarene, P. Fasano, and V. Vercellone, IP and ATM Persepctives, http://carmen.cselt.it/papers/ps254/ps254.html.*
RFC2098: Toshiba's Router Architecture Extensions for ATM, Feb. (1997).*
L. Zhang, S Deering, D. Estrin, S. Shenker, and D. Zappala, RSVP: A New Resource Reservation Protocol, IEEE Network (1993).*
S. Matsuzawa, K. Nagami, A. Mogi, T. JinMei, H. Esaki, and Y Katsube, Architecture of Cell Switch Router and Prototype System Implementation.*
R. Braden, L. Zhang, S. Berson, S. Herzog and S. Jamin, Resource Reservation Protocol (RSVP)—Version 1 Functional Specification, Network Working Group, RFC 2205, Sep. 1997.*

(List continued on next page.)

Primary Examiner—Hassan Kizou
Assistant Examiner—Joe Logsdon
(74) Attorney, Agent, or Firm—Blakely Sokoloff Taylor & Zafman LLP

(57) ABSTRACT

A method of establishing Quality-of-Service (QoS) communications within a network proposes the encapsulation of a control message that facilitates QoS for an associated data flow, according to a protocol not implementing resource reservation, such as the User Datagram Protocol (UDP). The encapsulated control message is then propagated through the network on a routed path, while the associated data flow is propagated over a short-cut path through the network.

30 Claims, 16 Drawing Sheets

OTHER PUBLICATIONS

"Design and Implementation of a QoS Capable Switch–Router", E. Basturk, A. Birman, G. Delp, R. Guerin, R. Haas, S. Kamat, D. Kandlur, P. Pan, D. Pendarakis, V. Peris, R. Rajan, D. Saha and D. Williams, *IBM Research Report*, (RC 20848), Jan. 31, 1997.

"QoS Extensions to MPOA", Walter Knitl, Ali Kujoory, Bob Klessing, Ram Dantu, Peter Robinson, Berhhard Petri, John Drake and Hiroshi Suzuki, ATM Forum Technical Committee, Subworking Group, Apr. 19–24, 1998 (98–0299).

A Framework for QoS–based Routing in the Internet, Eric Crawley, Raj Nair, Bala Rajagopalan, and Hal Sandick, Internet Draft, Apr. 9, 1998.

"A Framework for Integrated Services and RSVP over ATM", E. Crawley, L. Berger, S. Berson, F. Baker, M. Borden and J. Krawczyk, Internet Engineering Task Force, Internet Draft, Feb. 9, 1998.

"Support of Shortcuts for RSVP Flows Over ATM", R. Guerin, D. Kandlur, L. Li and V. Srinivasan and L. Berger, Internet Engineering Task Force, Internet Draft, Jul. 30, 1997.

"Multiprotocol Over ATM Version 1.0 (Letter Ballot)", Andre N. Fredette, *The ATM Forum*, May 29, 1997 (AF–M-POA–0087.000).

"Resource ReSerVation Protocol (RSVP)—Version 1 Message Processing Rules", R. Braden and L. Zhang, Network Working Group, Sep., 1997.

"Resource ReSerVation Protocol (RSVP)—Version 1 Functional Specification", R. Braden, L. Zhang, S. Berson, S. Herzog and S. Jamin, Network Working Group, RFC 2205, Sep.,1997.

"NBMA Next Hop Resolution Protocol (NHRP)", James V. Luciani, Dave Katz, David Piscitello and Bruce Cole, Routing Over Large Clouds Working Group, Internet Draft, Sep., 1997.

"IP Integrated Services with RSVP over ATM", S. Berson and L. Berger, Internet Draft, Mar. 26, 1997.

"Support for RSVP–based Service over an ATM Network", A. Birman, R. Guerin and D. Kandlur, Internet Engineering Task Force, Internet Draft, Feb. 22, 1996.

"IP over ATM: A Framework Document", R. Cole, D. Shur and C. Villamizar, Network Working Group, RFC 1932, Apr., 1996.

"A Framework for Supporting RSVP Flows Over ATM Networks ", R. O. Onvural and V. Srinivasan, Internet Engineering Task Force, Internet Draft, Feb. 26, 1996.

* cited by examiner

METHOD OF IMPLEMENTING QUALITY-OF-SERVICE DATA COMMUNICATIONS OVER A SHORT-CUT PATH THROUGH A ROUTED NETWORK

FIELD OF THE INVENTION

The present invention relates generally to the field of data communications over a network and, more specifically, to a method of performing Quality-of-Service (QoS) data communications over a short-cut path within a routed network.

BACKGROUND OF THE INVENTION

Routing typically provides a hop-by-hop path (routed path) through an Internet Protocol (IP) network. A resource reservation protocol may then be utilized to reserve resources along each hop of the routed path. An example of a protocol for performing such resource reservation is the Resource ReSerVation Protocol (RSVP), which is a protocol for signaling QoS requests for IP flows. The handling of QoS requests is dependent on the link layer applied within a network. A connection-oriented link layer, such as for example Asynchronous Transfer Mode (ATM), typically provides extensive QoS mechanisms, and further has the capability to bypass the routed network by setting up end-to-end connections spanning multiple nodes.

Resource reservation (or allocation) protocols typically require that state information regarding flows be maintained at various nodes throughout the network. For example, RSVP requires that state information for each RSVP flow be maintained at each intermediate RSVP router along a path. This negatively impacts the scalability of RSVP in large routed networks, with a large number of QoS flows, for two primary reasons. Firstly, as state information must be maintained at each intermediate node of a path along which resources have been reserved, memory consumption by state information becomes prohibitive. For example, consider that with RSVP the state information that must be stored for each IP flow includes several IP addresses, source and destination ports, and 32-bit Logical Interface Handles (LIHs). This limits the scalability of RSVP in terms of the number of routers that can be allowed in a data path, and also in the number of simultaneous RSVP flows that a single node can support. Secondly, as each intermediate node is required to examine and process the contents of resource-reservation control messages, implementation of a resource-reservation protocol within a large network may prove to be processor intensive at the various nodes. For example, within the RSVP protocol, each RSVP PATH message needs be captured and processed at each RSVP node along the data path. Parsing and processing such RSVP messages imposes a heavy compute load on the network when this needs to be done at each RSVP node along a routed data path.

Multi-Protocol Over ATM (MPOA) and the Next Hop Resolution Protocol (NHRP) provide mechanisms for "shortcutting" some of the hops along a routed path by setting by, for example, ATM Switched Virtual Circuits (SVCs) between ingress and egress points of the points of an ATM network, and diverting a data flow over the shortcut.

SUMMARY OF THE INVENTION

According to the present invention, there is provided a method of performing data communications over a network. A short-cut path is established through the network between an ingress node and an egress node. A data flow is propagated between the ingress and egress nodes over the short-cut path. A control flow, associated with the data flow, is encapsulated within a protocol not supporting quality-of-service. The encapsulated control flow is propagated from the ingress node to the egress node over a routed path through the network.

Responses to a control flow may be returned to the ingress node on the routed network.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of implementing Quality-of-Service (QoS) data communications over a short-cut path through a routed network is described. In the following description, for purposes of explanation, numerous specific details are set forth in order to provide a thorough understanding of the present invention. It will be evident, however, to one skilled in the art that the present invention may be practiced without these specific details.

Exemplary ATM Network

For the purposes of this specification, the term "message" shall be taken to refer to any discrete quantity of information, and to include (but not be limited to) packets, frames, datagrams and cells. The term "flow" shall be taken to include any one or more messages propagated from a source to a destination. The terms "ingress" and "egress" shall be taken to apply to nodes or devices that function as the end-points of a short-cut through a routed network.

Figure 1:
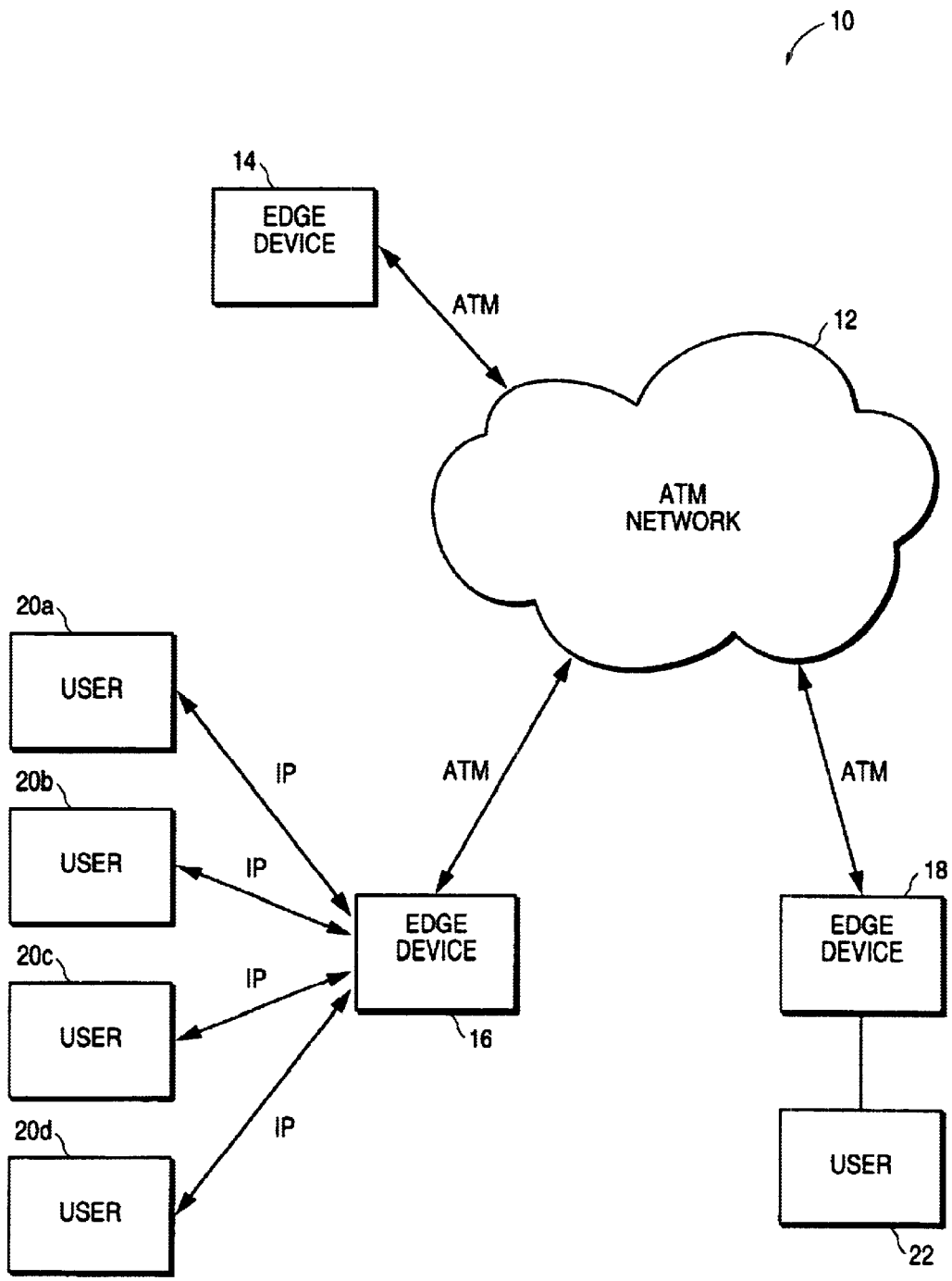
FIG. 1 is a diagrammatic representation of an exemplary network within which the present invention may be implemented.

FIG. 1 is a diagrammatic representation of an exemplary network 10 within which the present invention may be implemented. The network 10 includes a connection-oriented network such as, for example, an Asynchronous Transfer Mode (ATM) network 12 wherein data transmission (also termed cell switching) through the ATM network 12 relies on the establishment of logical connections between ATM entities therein. The transmission of information between ATM entities is dependent upon the establishment of logical connections between a source device and a destination device, these connections typically comprising virtual channels (VCs), virtual paths (VPs) and transmission paths, as is well known in the art. Virtual channels and virtual paths rely on the establishment virtual channel links (VCLs) that may either be in the form of permanent virtual circuits (PVCs) or switched virtual circuits (SVCs).

Three exemplary edge devices 14, 16 and 18 are shown coupled to the ATM network 12 by respective ATM connections, these edge devices facilitating the transfer of data packets from external sub-nets onto the ATM network 12. For example, an edge device may accommodate one or more Multi-Protocol Over ATM (MPOA) clients that allow the edge device to forward packets across sub-net boundaries using an Internetwork Layer protocol. The edge devices 14, 16 and 18 may be switches, such as the Centillion 100™ switch manufactured by Bay Networks, Inc. of Santa Clara, Calif.

User devices 20A–20D are shown coupled to the edge device 16, and communicate with the edge device using the IP protocol. Similarly, a user device 22 is shown coupled to the edge device 18. While the user devices 20A–20D, and 18, are shown coupled directly to respective edge devices, it will be appreciated that any number of other networks and network devices may be coupled between a user device and an edge device. In one embodiment, the present invention pertains to the short-cut path that forms a part of a routed path including the edge devices 16 and 18.

The user device 20D may require a certain guaranteed QoS for communications with the user device 22, and may use a resource reservation (or resource allocation) protocol to indicate or request the required QoS.

RSVP Over ATM Network

Figure 2:
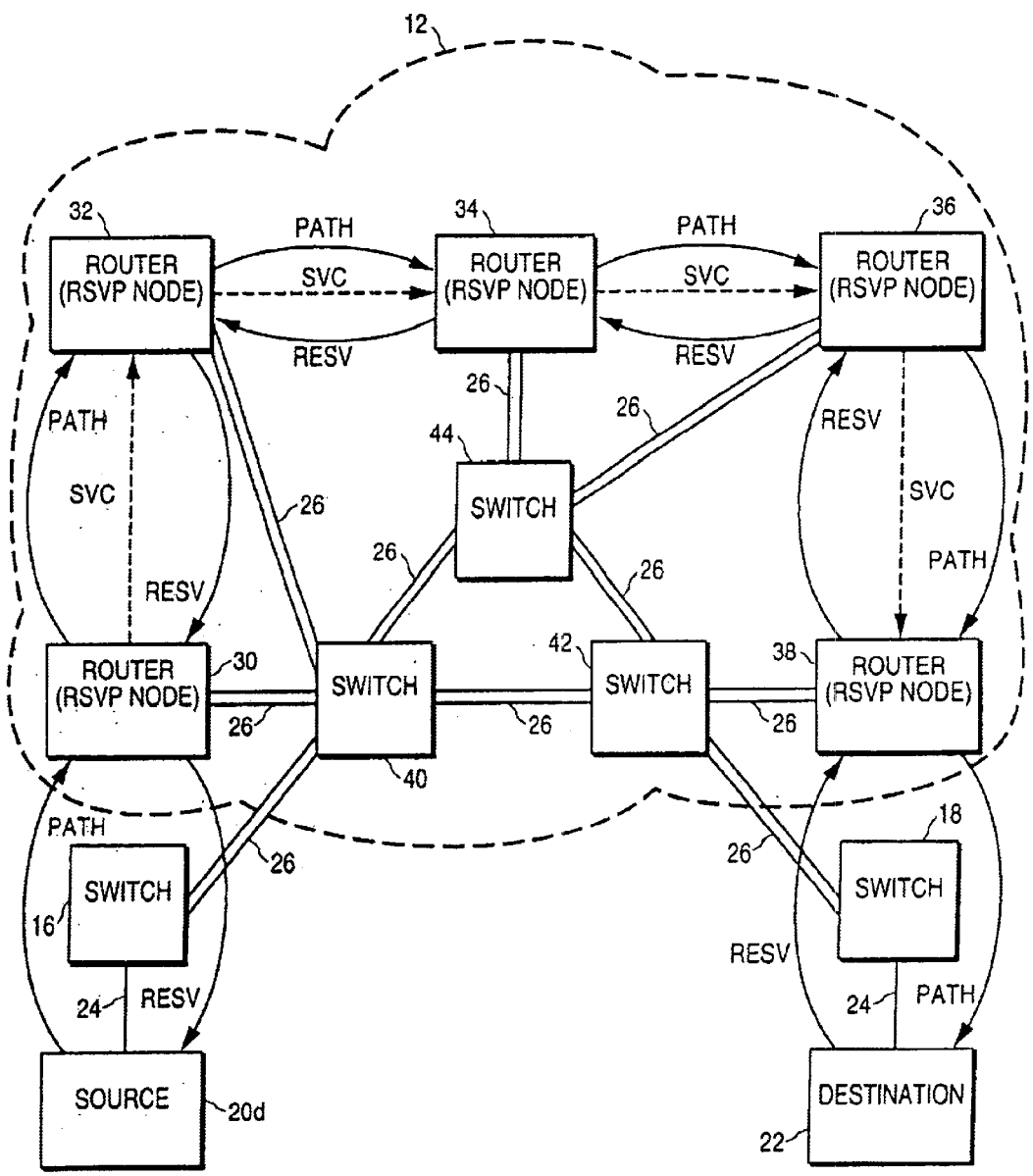
FIG. 2 is a diagrammatic representation of an exemplary ATM network within the Resource ReSerVation Protocol (RSVP) is implemented for the purposes of guaranteeing QoS for data transmissions.

FIG. 2 is a diagrammatic representation of an exemplary ATM network 12 within which the Resource ReSerVation Protocol (RSVP) is implemented for the purpose of guaranteeing QoS for data transmissions between the user device 20D (hereinafter referred to as the source 20D) and the user device 22 (hereinafter referred to as the destination 22). The source 20D and the destination 22 may be coupled to respective switches 16 and 18 by Ethernet or Token Ring network connections (shown as a single line), each of the switches 16 and 18 then being coupled to the ATM network 12 by physical ATM connections 26 (shown in double line). While it will be appreciated that the ATM network 12 may comprise any number and configuration of devices, for the purposes of illustration the network 12 is shown to include ATM routers 30–38 and ATM switches 40–44. The physical ATM connections 26 that exist between these devices is shown in double line, and the logical connections, such as the illustrated SVCs, therebetween are shown in broken line. Each SVC may be controlled by PATH/RESV messages, as will be described in further detail below, and by ISSL-ATM mappings. Each of the routers 30–38 supports the RSVP protocol, and may accordingly be regarded as a RSVP node.

Figure 3:
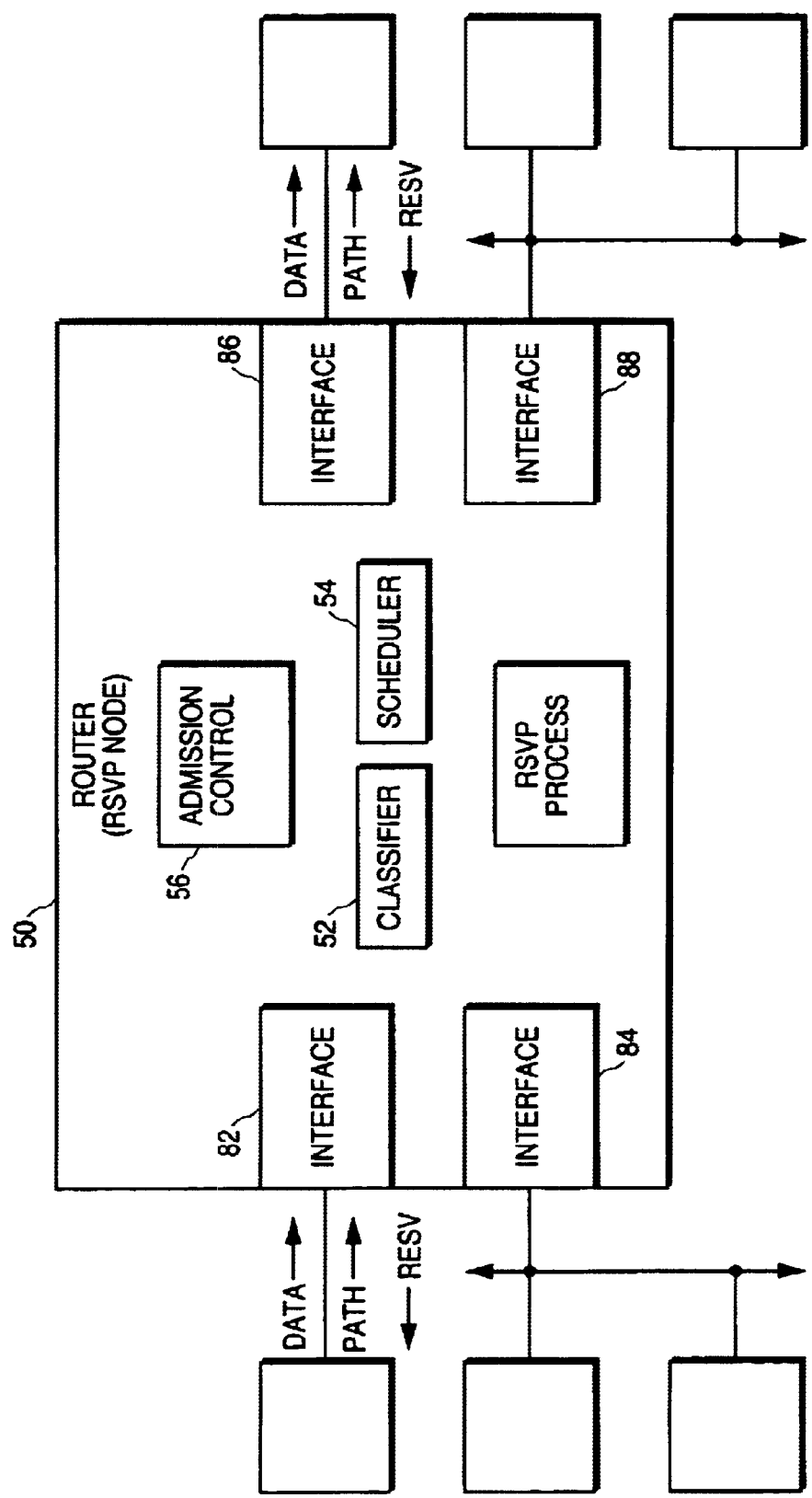
FIG. 3 is a diagrammatic representation of a RSVP node, which may be implemented on a router.

For the purposes of the present specification, a distinction is made between a "data flow" and a "control flow". Specifically, QoS may be implemented for a particular data flow by mechanisms referred to collectively as "traffic control". Referring to FIG. 3, there is illustrated an exemplary router 50, which functions as a RSVP node. The "traffic control" mechanisms that are hosted within the router 50 include a packet classifier 52, a packet scheduler 54 and an admission control 56. As is known in the art, these mechanisms are responsive to PATH messages and RESV messages. Specifically, PATH messages are generated by a source requiring a guaranteed QoS (e.g., peak/average bandwidth and delayed bounds), the desired QoS being identified in the PATH message. The PATH message is then propagated to a destination, which returns a RESV message to the source confirming the resource reservation for an associated data flow. For the purposes of the present specification, the term "data flow" shall be taken to refer to any data propagated from a source to a destination, and the term "control flow" shall be taken to refer to any messages or signals generated for the purposes of resource reservation or QoS determination for an associated data flow. The term "control flow" may thus be taken to include, but is not limited to, the above-mentioned PATH and RESV messages.

As alluded to above, the main control messages in RSVP are the PATH and RESV messages. As illustrated in FIG. 2, PATH messages may flow from the source 20D to the destination 22, with each RSVP node along a routed path intercepting each PATH message, processing the message, and using the message to reconstruct a reverse path. The RESV messages originate at the destination 22, and follow a reverse routed path, as reconstructed from state information left by the PATH messages. The RESV messages are sent to an explicit RSVP node on the routed path. FIG. 2 illustrates each of the routers 30–38 being connected to a downstream router by a SVC, the characteristics of each SVC being controlled by the respective PATH and RESV messages.

Figure 4:
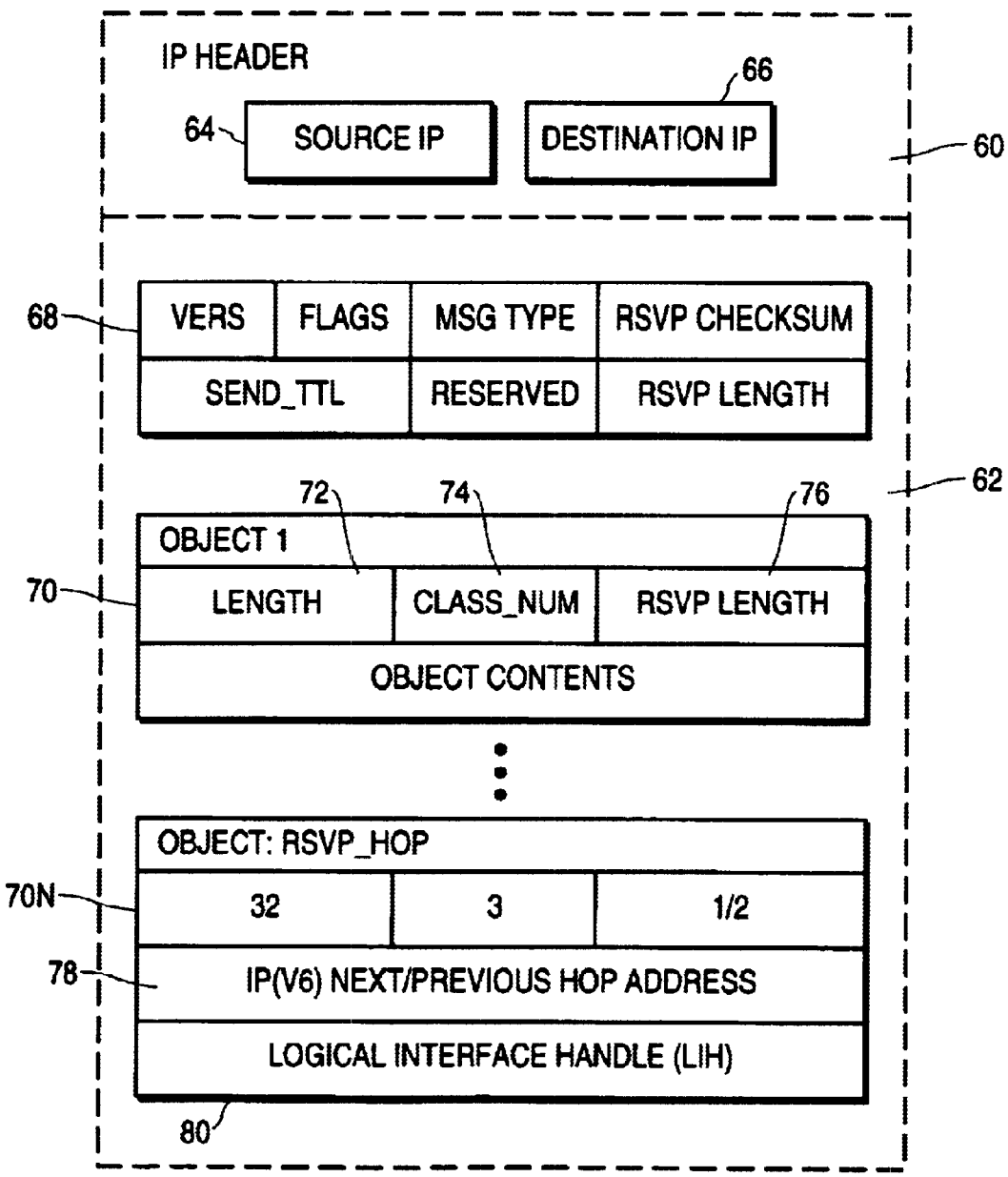
FIG. 4 is a diagrammatic representation of a RSVP message format.

Referring to FIG. 4, a diagrammatic representation of a RSVP message format, to which both PATH and RESV messages conform, is illustrated. Specifically, each RSVP message includes an IP header 60 and a RSVP header 62. The IP header 60 includes both a source IP address and a destination IP address 66. The IP header of a PATH message includes an alert option that extends the header 60 beyond the usual 20 byte length. The alert option results in each router along a routed path examining and processing the PATH message. The IP header of a RESV message, on the other hand, does not include an alert option, and thus does not trigger any action beyond the normal forwarding when received at a router.

The RSVP header 62 includes a common header 68, followed by a body including a variable number of variable-length, typed "objects". For each RSVP message type (e.g., PATH or RESV message types), there exists a set of rules for the permissible choice of object types. Each object consists of one or more 32-bit words with a 1-word header specifying the total object length 72, the object class 74 and the object type 76.

Among the object classes that may be included within the RSVP message is the RSVP_HOP object class, an example of which is illustrated at 70N. The RSVP_HOP object 70N is shown to carry an IP address 78 of the RSVP-capable node that sent the relevant message and also a Logical Interface Handle (LIH) 80. The LIH 80 is used to distinguish logical outgoing interfaces. For example, a RSVP node receiving a LIH in a PATH message saves its value, and returns it in the RSVP_HOP object of subsequent RESV messages sent to the node that originated the LIH 80. The LIH 80 should have a value of zero (0) if there is no logical interface handle.

The LIH 80 is particularly suited to distinguishing between a number of logical outgoing interfaces for a logical connection (such as a SVC) between two RSVP nodes. For example, referring to FIG. 2, when the RSVP node at router 30 forwards a PATH message out of a logical outgoing interface, it includes in the PATH message a LIH value for the relevant logical outgoing interface. The RSVP node at router 32 then stores the LIH value in its path state, so that when this RSVP node sends a RESV message to the RSVP node at router 30, it includes the LIH value from its path state in the RSVP_HOP object. When the RSVP message arrives at the RSVP node at router 30, its LIH value provides the necessary information to attach the resource reservation to the appropriate outgoing logical interface. The router 50 illustrated in FIG. 3 is shown to include a number of interfaces 82–88 that all share an IP address of the router 50. This typically occurs where several ATM or frame relay connections exist on the same physical interface. The LIH may be used to identify which specific connection is used for the control messages (e.g., the PATH and RESV messages).

The LIH may also be used in situations where an interface has no IP address (termed an unnumbered interface). A PATH or RESV message can utilize an IP address of the router in conjunction with a LIH to identify a correct unnumbered interface.

The present invention, in one embodiment, proposes using the LIH that identifies the MPC, residing on a physically distinct switch, as a data source while using an IP address to identify an associated controlling router hosting a MPS.

Regarding PATH and RESV messages, a number of fundamental characteristics distinguish each of these message types. Firstly, regarding PATH messages, the following characteristics of these messages should be noted:

1. PATH messages are intercepted at each RSVP node along a routed path, and add or "drop" state information at each of these RSVP nodes. An intercepting RSVP node may alter some of the contents of the PATH message, but may not alter the source IP address 64 or the destination IP address 66, as contained in the IP header 60.

2. PATH messages include the destination IP address 66 of the destination 22 of the data flow and a source IP address 64 of the source 20D of the data flow (and not the IP address of any intermediate node or interface modifying and forwarding the PATH message). This guarantees that the PATH message will follow the routed data path regardless of the unicast or multicast routing algorithm used.

3. The RSVP_HOP object within each PATH message includes the IP address 78 of the sending RSVP node, and the LIH 80 identifying the sending interface associated with the sending RSVP node. The RSVP_HOP object accordingly specifies the RSVP node, and the interface of this node, for which resources are reserved or allocated.

Turning now to RESV messages, the propagation of these messages will be described with reference to the exemplary network shown in FIG. 2. RESV messages may be generated by the destination 22 in response to the receipt of a PATH message, and are sent to a upstream RSVP node on router 38. The RESV messages are able to retrace the path followed by an associated PATH message, as each RSVP node stores the contents of each RSVP_HOP object in each PATH message received thereat. RESV messages are characterized in that:

1. RESV messages include the destination IP 66 of an immediately upstream RSVP node, this IP address being the IP address 78 carried by a corresponding PATH message in its RSVP object.

2. The RSVP_HOP object of each RESV message includes the IP address 78 of the sending interface of the immediately upstream RSVP node and the LIH 80 corresponds to the LIH of the corresponding PATH message sent by the immediately upstream RSVP node. The LIH is accordingly meaningful to the entity owning the destination IP address 66 of the RESV message (i.e., the immediately upstream RSVP node). In contrast, the LIH 80 of a PATH message is meaningful to the entity owning the IP address 78 in the RSVP_HOP object (and not the destination IP address 66 in the IP header 60, as is the case with a RESV message).

3. RESV messages are interpreted by the entity owning the destination IP address 66 within the IP header 60. Other intermediate RSVP nodes forward the RESV message unchanged. For example, a RESV message propagated from the RSVP node on the router 38, and including the IP address of the RESV node on router 36, would be interpreted only by the RSVP node on router 36, and no other RSVP nodes.

4. Resources are reserved on the interface identified by the LIH 80 within the RSVP_HOP object of the RESV message, regardless of the interface via which the RESV message actually arrived.

As noted above, the scalability of the RSVP protocol is limited in that one RSVP-controlled data flow passing through N RSVP nodes stores N copies of the RSVP state (i.e., one copy of the RSVP state per router), and implements N–1 QoS SVC connections on the routed path (i.e., one SVC connection per hop). Furthermore, each PATH message must be processed at each RSVP node, while a RESV message is interpreted only at, for example referring to FIG. 2, router 36 even if it traversed a further router, such as the router 34, on the way to the router 36.

ATM Short-Cuts for RSVP Flows

In order to address the scalability problems discussed above, it is possible to establish "short-cuts" (or short-cut paths) for RSVP flows within an ATM network so as to effectively bypass many RSVP nodes intermediate a source 20D and a destination 22. Further details regarding short-cuts are provided in the document "Support of Shortcuts for RSVP Flows Over ATM", Internet Engineering Task Force, Guerin et al., Jul. 30, 1997.

Figure 5:
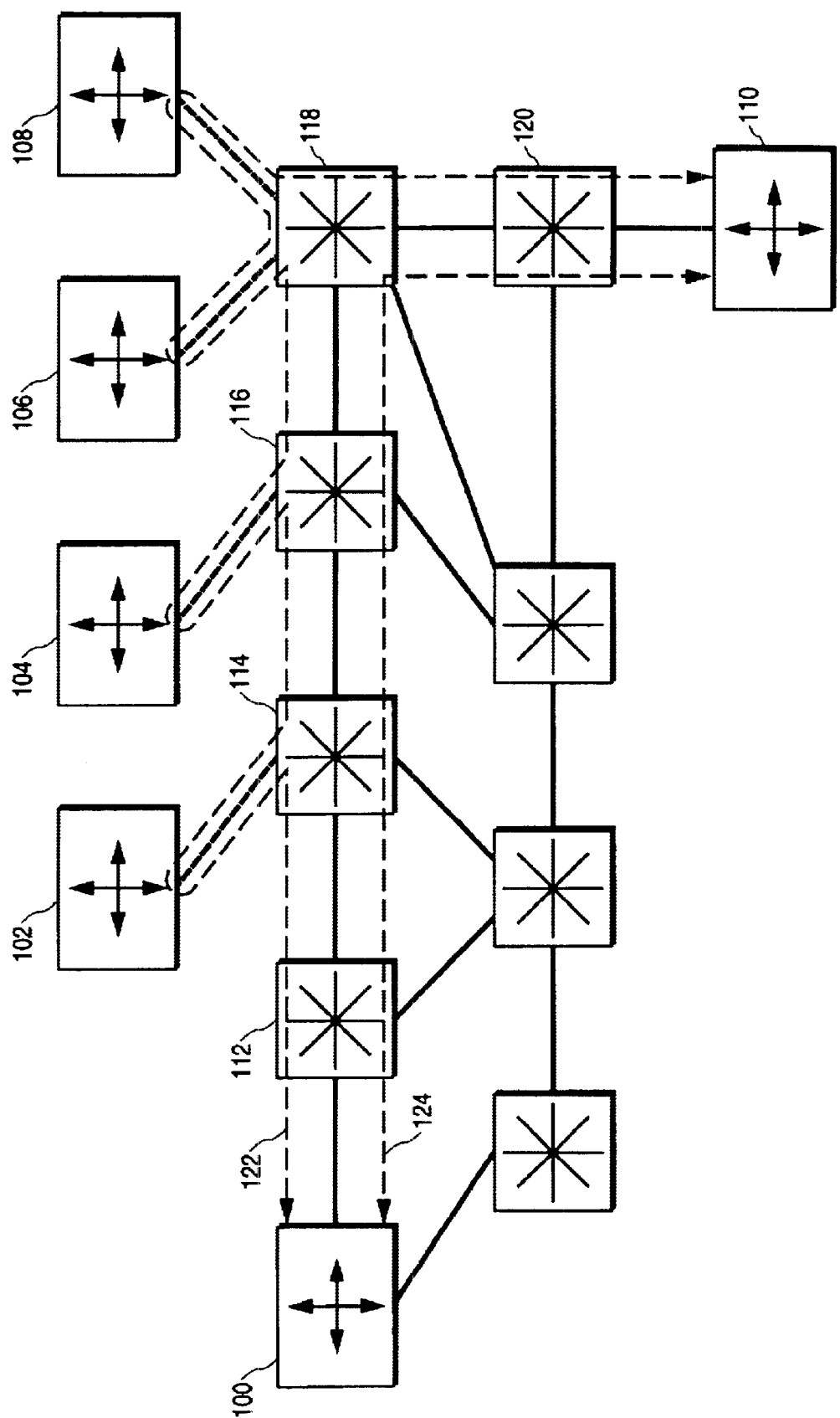
FIG. 5 is a network showing both a routed path and a short-cut path through the network.

A distinction between a routed path and a short-cut path will now be discussed with reference to FIG. 5. FIG. 5 is a diagrammatic representation of a network comprising a number of routers 100–110, and a number of switches 112–120. An exemplary routed path would traverse all routers 100–110 and all switches 112–120. Specifically, an exemplary routed path would include all hops between the routers 100–110 and the switches 112–120. The routed path is illustrated in broken line at 112. A short-cut path, as illustrated in broken line at 124, on the other hand includes only the hops between the router 100 and the switch 112, between the switch 120 and the router 110, and between the switches 112–120. It will be appreciated that, by propagating an RSVP flow on a short-cut path 124 as opposed to a routed path 122, the maintenance of state information and the processing of control flow messages at the routers 102–108 is avoided.

The establishment of a short-cut path may be triggered when data traffic volume between a source and destination exceeds a predetermined threshold. Various short-cut path establish mechanisms may be utilized such as, merely for example, the Next Hop Resolution Protocol (NHRP) or the Multi-Protocol Over ATM (MPOA) mechanisms. Further details will be given below regarding the establishment of a short-cut path using the MPOA mechanism. However, it will be appreciated that the teachings of the present invention could be utilized with any other short-cut path establishment mechanisms, such as NHRP, or any combination of such mechanisms.

MPOA as Short-Cut Path Establishment Mechanism

A detailed description of MPOA is provided in the document "Multi-Protocol Over ATM", Version 1, ATM Forum, Multi-Protocol Sub-Working Group, May 29, 1997. Specific features of MPOA useful to an understanding of the present invention will be described below.

Figure 6:
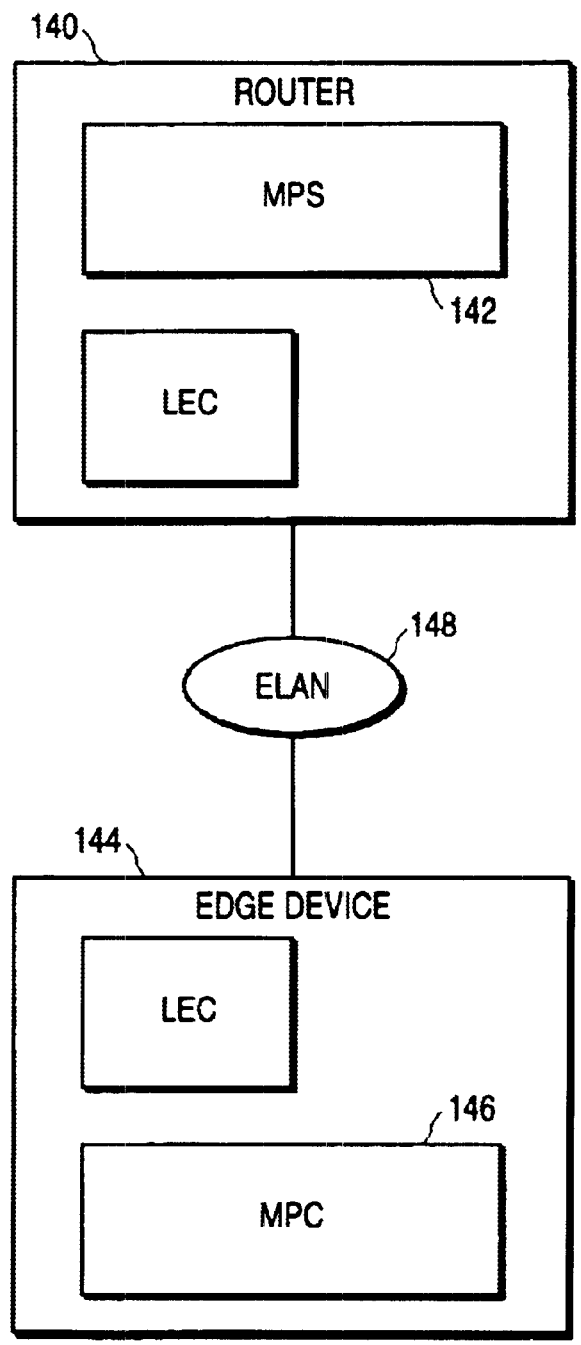
FIG. 6 shows a MPOA client hosted on an edge device, and a MPOA server hosted on a router.

Referring to FIG. 6, MPOA proposes a client/server architecture in which MPOA clients (MPCs) and MPOA servers (MPSs) are connected via an Emulated Local Area Network (ELAN). FIG. 6 illustrates a router 140 hosting a MPS 142 and an edge device 144 hosting a MPC 146. The MPC 146 functions to source and synchronize internetwork short-cut paths. Specifically, the MPC 146 detects flows of packets that are being forwarded over the ELAN 148 to the router 140 hosting the MPS 142. Upon recognition of the flow that may benefit from a short-cut path that bypasses a routed path, the MPC 146 uses a NHRP-based query-response protocol to request the information required to establish a short-cut path to the destination. If a short-cut path is available, the MPC 146 caches the information in an ingress cache, sets up a short-cut path in the form of a VCC from the edge device 144 to the destination, and forwards frames to the destination over the short-cut path.

In an egress role, the MPC 146 receives data frames from other MPCs to be forwarded to its local interface or users. For frames received over the short-cut path, the MPC 146 adds appropriate DLL (Data Link Layer) encapsulation and forwards them to the higher layers.

The MPS 142 provides internetwork layer forwarding information to the MPC 146.

In summary, MPOA defines the protocols for MPC/MPS communications. Information flows between the MPS 142 and MPC 146 can be regarded as either MPOA control flows or MPOA data flows. The control flows include the MPOA Resolution Request/Reply messages that allow the MPC 146 to obtain short-cut information and the MPOA Cache Imposition Request/Reply messages that allow an egress MPS to give an egress MPC egress cache information. Further information regarding these control flows is provided below.

Figure 7:
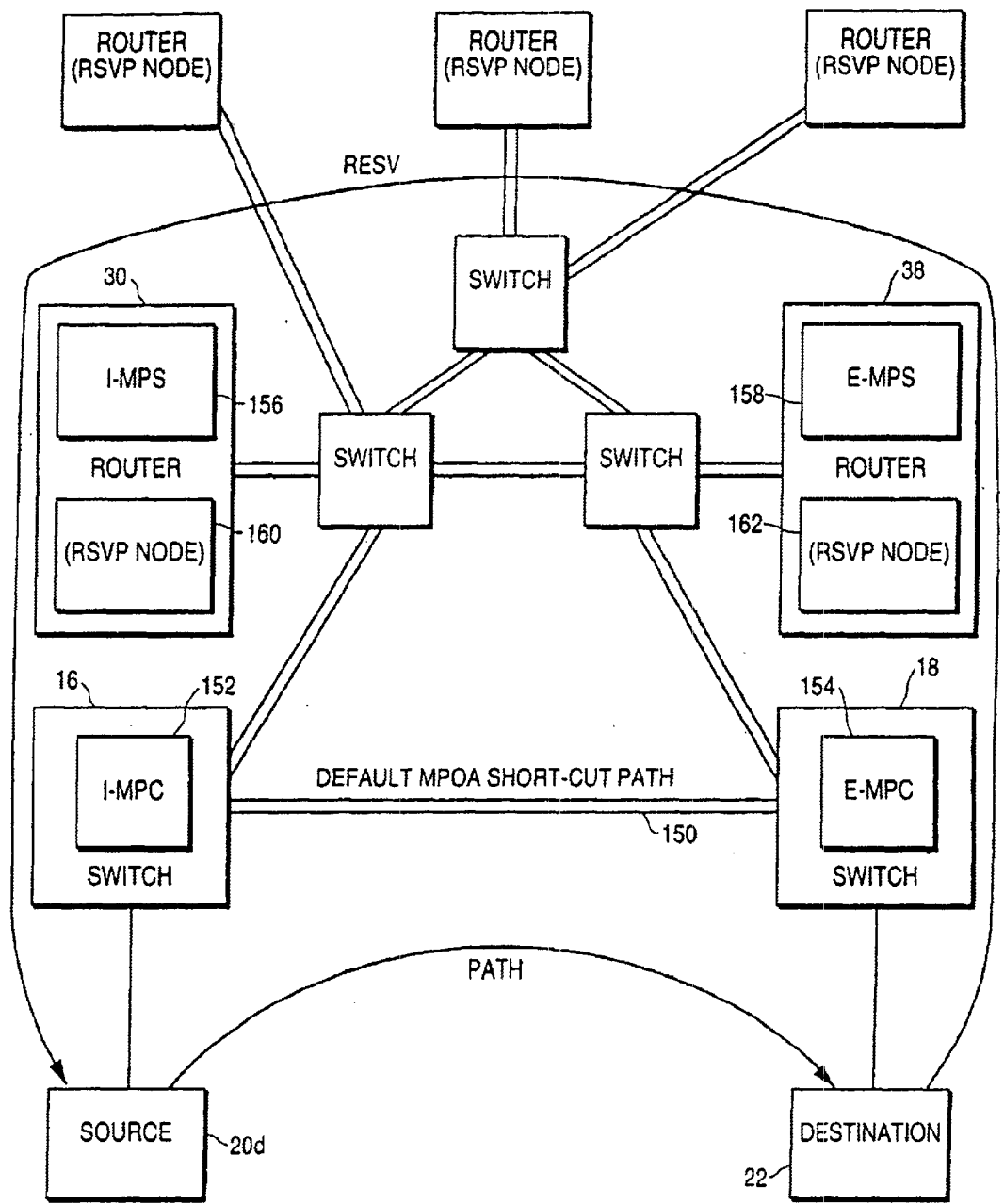
FIG. 7 illustrates a network implementing MPOA through which a default MPOA short-cut path has been established, and in which RSVP messages are not processed at ATM routers along a routed path on account of the RSVP messages being diverted over the MPOA short-cut path.

FIG. 7 illustrates a MPOA implementation within the network illustrated in FIG. 2. A default MPOA short-cut path is established between an ingress MPC (i-MPC) 152, hosted on the switch 16, and an egress MPC (e-MPC) 154, hosted on the switch 18. The ingress MPC 152 is associated with an ingress MPS 156, and the egress MPC 154 is similarly associated with an egress MPS 158. A packet received from the sender 20D at the ingress MPC 152 is examined to determine whether it is part of a flow for which a short-cut has been established. By default, the packet is bridged over an ELAN from the ingress MPC 152 to the ingress MPS 156. If the packet follows a default routed path, it leaves the ingress MPC 151 via an internal LAN Emulation Client (LEC) Service Interface. On the other hand, should the packet form part of a flow for which a short-cut path has been established, the ingress MPC 152 strips the DLL encapsulation from the packet and sends it via a short-cut path 150. The ingress MPC 152 may attach a prefix to the packet with tagging information prior to sending it via the short-cut 150.

In the event that no flow has previously been detected, each packet being sent to the ingress MPS 156 is examined to determine the IP destination address. If a threshold number of packets are received within a predetermined time, the MPC 152 sends an MPOA Resolution Request to the MPS 156 to obtain an ATM address to be used for establishing a short-cut path to the MPS 156 to a specific downstream device (e.g., the egress MPC 154) for the purposes of directing a data flow to the destination 22.

On arriving via the short-cut path 150 at the egress MPC 154, a data packet is examined with a view to identifying a matching egress cache entry. If a match is found, the packet is encapsulated using information in the egress cache and forwarded to the destination 22.

The above description has provided a summary description pertaining to data flows. The situation with respect to control flows is somewhat more complicated. Consider for example the transmission of a PATH message from the source 20D to the ingress MPC 152, after the establishment of the MPOA short-cut path 150. Specifically, the ingress MPC 152 will match the destination IP of the PATH message to the MPOA short-cut path 150, thus causing the PATH message to be propagated on the short-cut path 150, as illustrated in FIG. 7. It will be appreciated that, as the PATH message is accordingly not received and processed at any of the routers along the routed path, the PATH message accordingly also bypasses a RSVP node 160 hosted on the router 30. As the result, the RSVP node downstream from the egress MPC 154 perceives that the RSVP path has been broken and that QoS is not being implemented on the short-cut path 150. Specifically, the RSVP node downstream from the egress MPC 154 interprets PATH messages forwarded, but not processed, via the ingress MPC 152 through the shortcut and via egress MPC 154 (but generated by the sender) and QoS is not implemented as the flow will include an IP address associated with the short-cut path 150. Accordingly, no special treatment is accorded the flow. Further, in view of the bypassing of the RSVP node 160 on the router 30, the destination 22 will not have information regarding the IP address and the LIH for the previous RSVP node. Accordingly, a RESV message generated by the destination 22 in response to such a PATH message, and returned to the source 20D via a routed path, will not drop state at any RSVP nodes, including the RSVP node 160 hosted on the router 30. Accordingly, no QoS is implemented on the MPOA short-cut 150.

In summary, the situation illustrated in FIG. 7 is problematic in that the exchange of RSVP control messages between the end points of the short-cut path 150 occurs without keeping state at any of the bypassed RSVP nodes, including the RSVP node 160, and no QoS is provided across the ATM short-cut path 150.

The Logical RSVP Node

Figure 8:
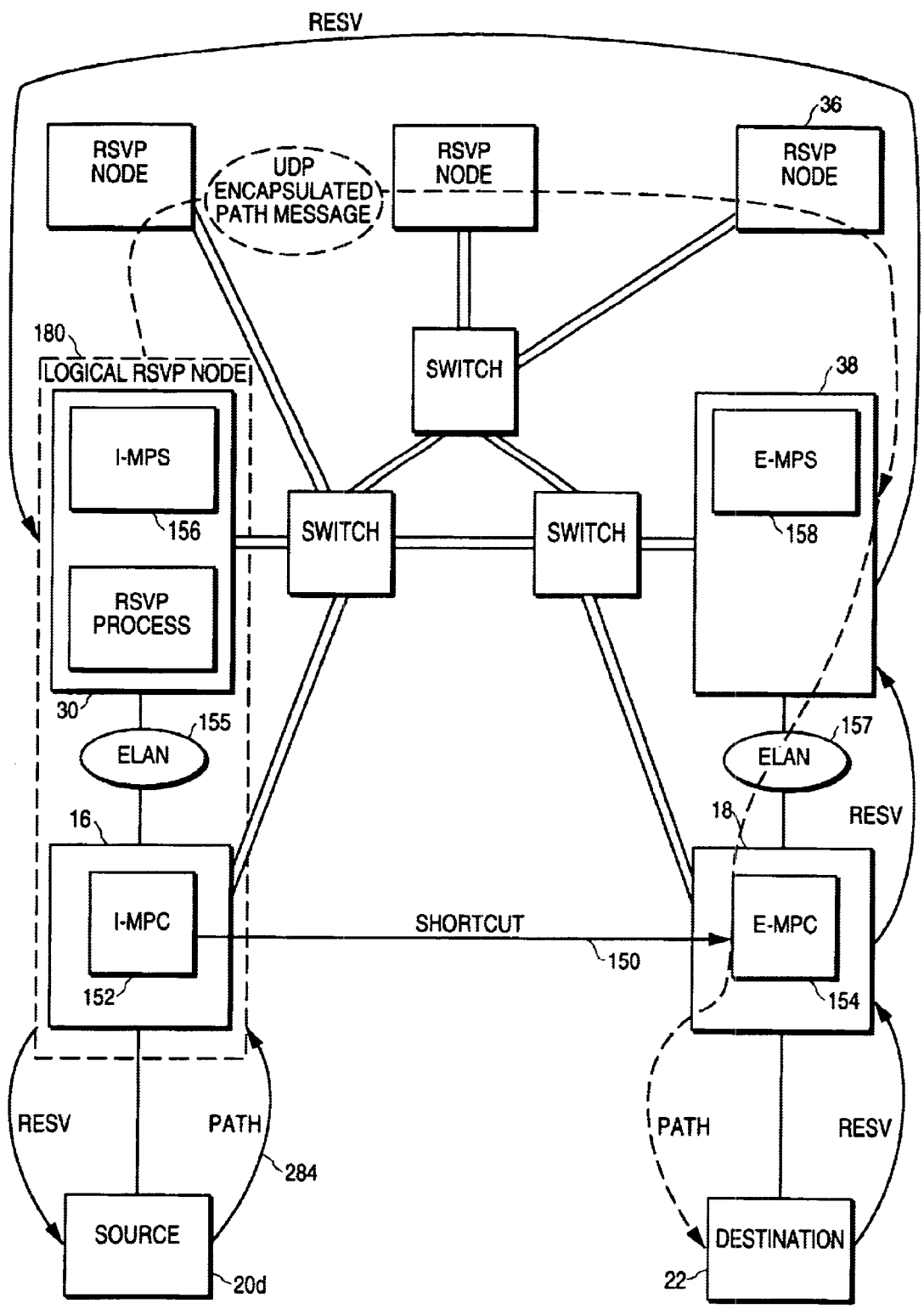
FIG. 8 is a diagrammatic representation of a network illustrating the establishment of a logical RSVP node and the propagation of a control flow through a UDP tunnel, according to exemplary embodiments of the present invention, so that an egress node forwards but does not process a PATH message.
Figure 9:
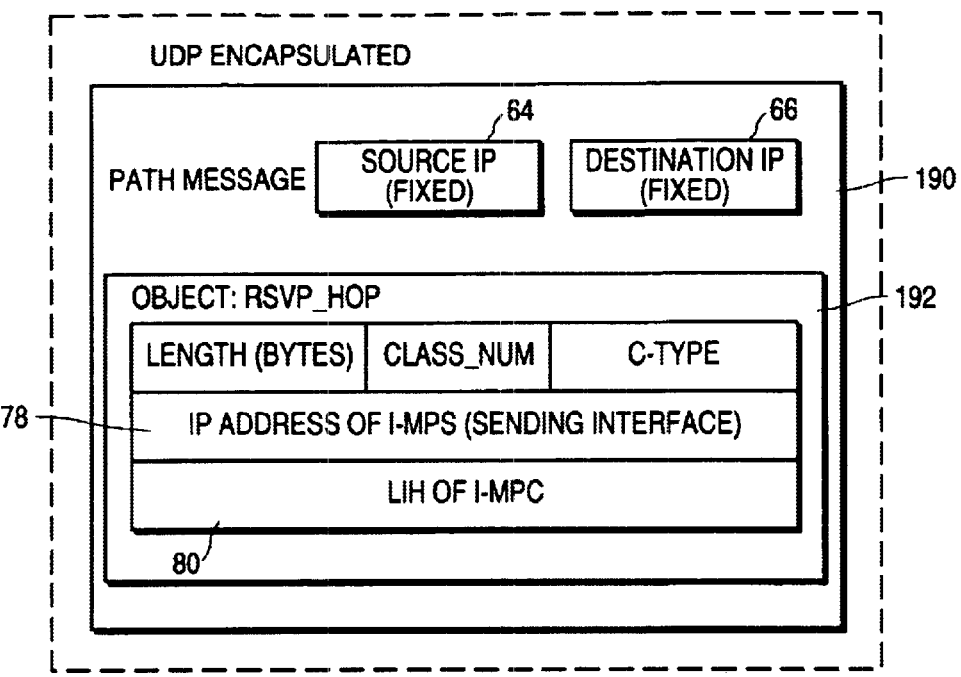
FIG. 9 is a diagrammatic representation of a UDP encapsulated PATH message, according to one embodiment of the present invention.

With a view to addressing the above issue, the present invention proposes, in one exemplary embodiment, incorporating both the ingress MPC 152 and the ingress MPS 156 within a logical RSVP node 180, as illustrated in FIG. 8. Specifically, the present invention proposes that the logical RSVP node 180 receive, process and send both PATH and RESV messages. In one embodiment of the invention, the logical RSVP node 180 is facilitated by issuing PATH messages including a RSVP_HOP object for which the IP address 78 is the address of the ingress MPS 156 and the LIH 80 identifies the ingress MPC 152. The logical RSVP node 180 is further implemented by forwarding RESV messages arriving at the ingress MPS 156 upstream and also converting such received RESV messages into control messages propagated to the ingress MPC 152 via an ELAN 155 or an MPC-MPS control ATM connection. Further, the present invention proposes establishing a User Datagram Protocol (UDP) tunnel between the logical RSVP node 180 and the egress MPS 158. Specifically, the UDP tunnel is created by encapsulating a control flow, such as for example the PATH message or a PATH_TEAR message that each include a router alert option, within a protocol not supporting QoS or resource reservation, such as for example UDP. In an alternative embodiment of the invention, a Transmission Control Protocol (TCP) tunnel may be created, wherein messages comprising the control flow are encapsulated as TCP messages. The MPS 158 extracts the control messages from the encapsulation (e.g., the UDP packet) and forwards such PATH messages without processing them FIG. 9 illustrates an exemplary PATH message 190, which has been UDP encapsulated for propagation through the above mentioned UDP tunnel. The PATH message 190 includes the source IP address 64 and the destination IP address 66 of the source 20D and the destination 22 respectively. The PATH message 190 further includes a RSVP_HOP object 192 which includes an IP address 78 of the ingress MPS 156 (i.e., the sending interface), and the LIH 80 of the ingress MPC 152 (i.e., the interface for which resources are to be reserved). As mentioned above, the IP address 78 stored within the RSVP_HOP object 192 of a PATH message 190 is significant in that it is to this IP address that a responsive RESV message is sent. Further, the LIH 80 is significant, as this identifies an interface for which resources are allocated or reserved. Accordingly, by including the IP address of the ingress MPS 156 within the RSVP_HOP object 192, it is ensured that RESV messages are returned to the ingress MPS 156. The inclusion of the LIH 80 for the ingress MPC 152 ensures that resources reserved as a result of the control flow are for the short-cut path 150, for which the ingress MPC 152 is an end-point.

As explained above, a PATH message will drop state information at each RSVP node that it traverses. Further, in order to achieve QoS for the short-cut path 150, RSVP control messages, such as for example PATH messages, must appear to RSVP nodes downstream of the egress MPC 154 as though they came directly from the logical RSVP node 180. It will be appreciated that were PATH messages to be propagated over the routed path, all intermediate RSVP nodes would capture the PATH messages and modify them. For example, the egress MPS 158 would perceive such a PATH message as having been received from the RSVP node hosted on the router 36, and accordingly reserve resources for a connection between the logical RSVP node 182 and the RSVP node on the router 36.

In order to avoid the above scenario, the present invention proposes that the ingress MPS 156 encapsulate the path message 190 in a UDP frame or packet, as illustrated in FIG. 9, and propagate such an encapsulated PATH message to a UDP port on the egress MPS 158. The egress MPS 158 then extracts the RSVP control message received at this UDP port, and forwards the control message to the IP destination (i.e., the destination 22) without processing the RSVP control message. Accordingly, a PATH message is interpreted by the RSVP node immediately downstream of the egress MPC 154, which recognizes the logical RSVP node 180 as being the immediately upstream RSVP node and the interface for which resources are to be reserved as being the ingress MPC 152, and which responds with a RESV message to the ingress MPS 156.

In an alternative embodiment of the present invention, the egress MPS 158 and MPC 154 may together constitute second logical RSVP node, in the same manner as the ingress MPS 156 and MPC 152 constitute such a logical node.

The encapsulation of the PATH messages is advantageous in that it avoids the propagation of a control flow over a short-cut 150 established between the ingress and egress MPCs 152 and 154, so that the resources reserved on the short-cut are fully available to the data flow. Further, the UDP tunnel limits RSVP processing to the ingress MPS 156, which is hosted on a RSVP-capable router. Further, data forwarding from the ingress MPC 152 is simplified in that the ingress MPC 152 is required to examine only TCP or UDP headers, while simply forwarding all control messages comprising a control flow to the ingress MPS 156 for processing. For example, RSVP messages may be identified as such by a protocol identifier of 80 in their respective IP headers. Finally, the ingress MPS 156 receives all control messages that would otherwise be sent on a short-cut path between the MPCs 152 and 154, and thus will receive the RESV messages that will trigger the short-cut path set up.

Figure 10:
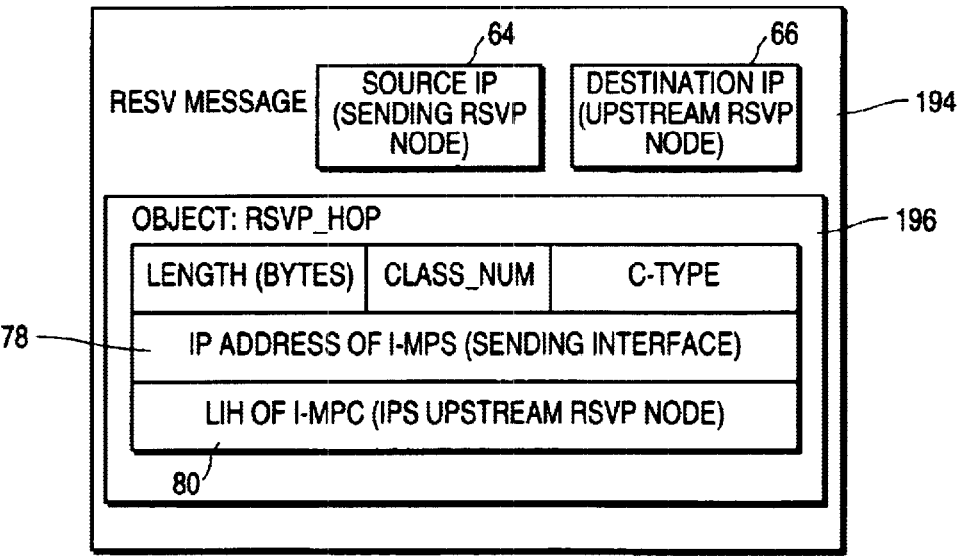
FIG. 10 is a diagrammatic representation of a RESV message constructed according to an exemplary embodiment of the present invention.

On receipt of a PATH message from the egress MPS 158, the destination 22 generates a RESV message 194, such as that illustrated in FIG. 10. The RESV message 194 includes a destination IP address 66 of the ingress MPS 156 (i.e., the IP address 70 is included within the RSVP_HOP object 192 within the PATH message 190). The RESV message 194 may take any routed path through the network, as it only reserves resources at the RSVP node identified by the destination IP address 66. The RSVP message 194 includes a RSVP_HOP object 196, that in turn includes an IP address 78, and a LIH 80 identifying the ingress MPC 152, the LIH 80 informing the ingress MPS 156 that the RESV messages refers to the ingress MPC 152, and not to an internal interface of the ingress MPS 156. The IP address 78 may be any IP address used by the MPS 156 and is utilized to deliver an a RESV message back to the MPS 156.

On receipt of the RESV message 194, the ingress MPS 156 performs two actions, namely the forwarding of the RESV message upstream, and also the converting of the RESV message into control messages for the ingress MPC 152.

Methodology

Figure 11:
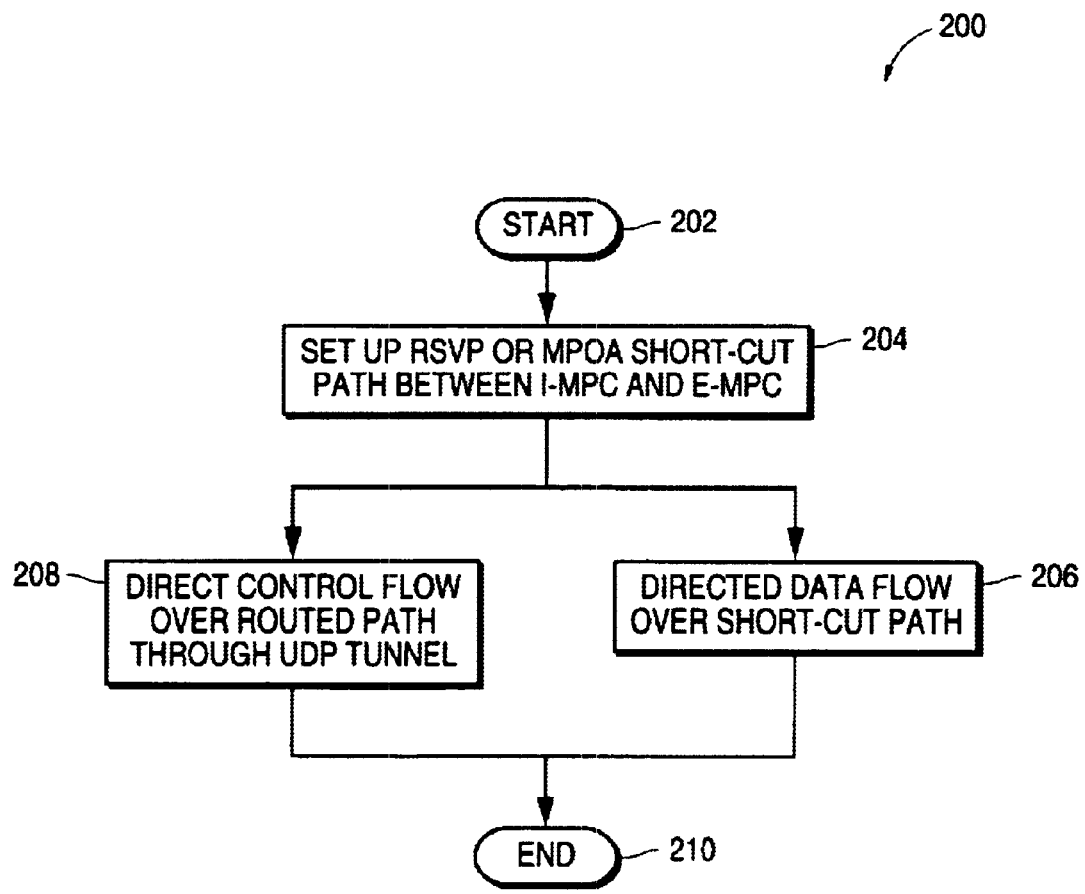
FIG. 11 is a flow chart illustrating three exemplary methods, according to the present invention, for implementing QoS communications over a network.

FIG. 11 is a flow chart illustrating three broad functions, or methods, performed with a view to implementing an exemplary embodiment of the present invention. Specifically, FIG. 11 shows a flow chart illustrating a method 200 of setting up and performing QoS data communications over a short-cut path through a routed network, according to an exemplary embodiment of the present invention. The method 200 commences at step 202, then proceeds to method 204, wherein a MPOA or a RSVP short-cut is established between the ingress MPC 152 and the egress MPC 154. Thereafter, at method 206, a data flow is directed over the established short-cut path. At method 208, a control flow is directed over a routed path, through a UDP tunnel. Methods 206 and 208 may occur in parallel, or serially. The method 200 then terminates at step 210. Further details regarding each of the methods 204, 206 and 208 are provided in the flow charts illustrated in FIGS. 12, 14, 15 and 16, with reference to the exemplary network shown in FIG. 8, and the PATH and RESV messages 190 and 194 illustrated in FIGS. 9 and 10.

Figure 12:
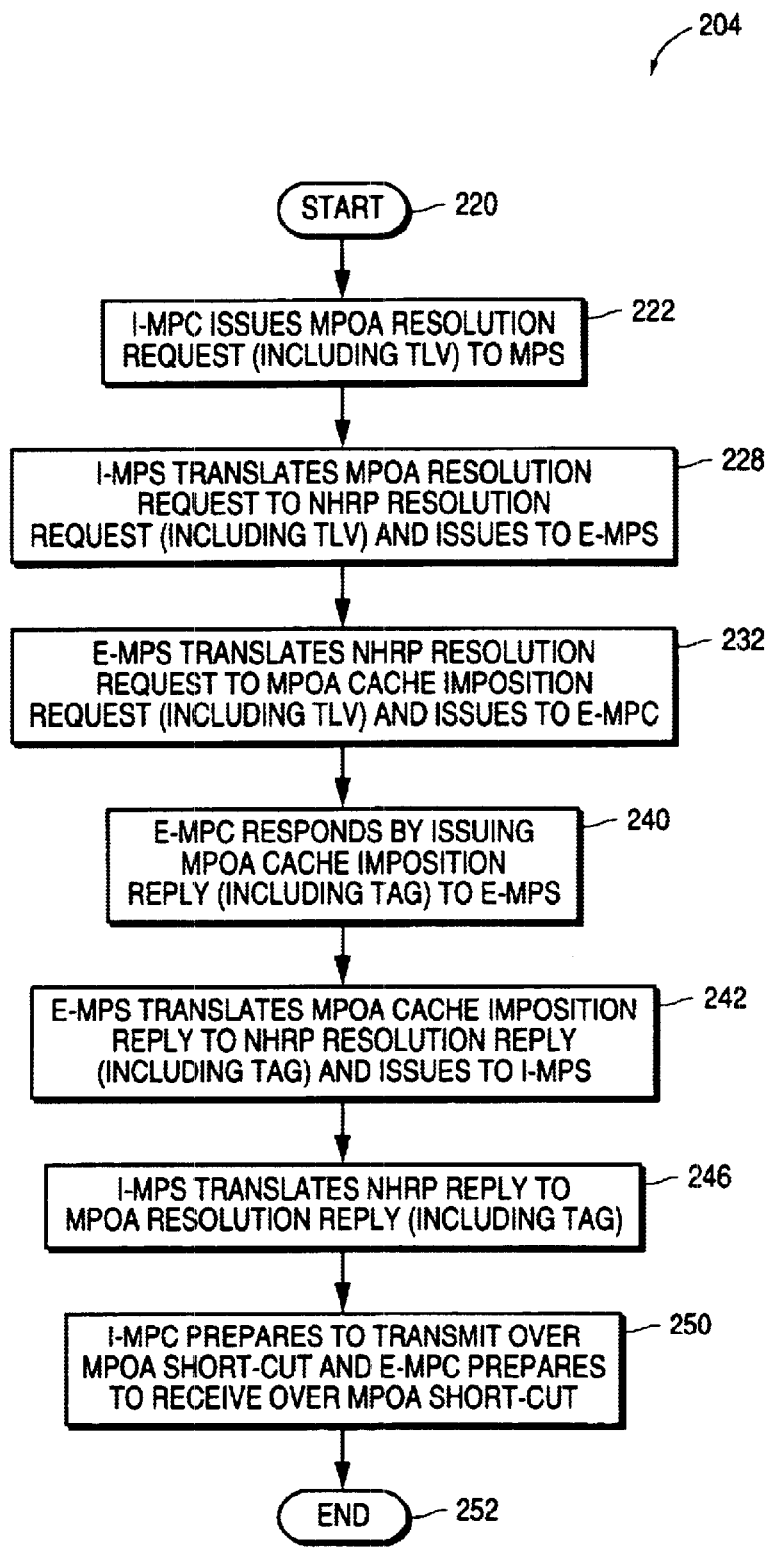
FIG. 12 is a flow chart illustrating a method, according to an exemplary embodiment of the present invention, of setting up a MPOA short-cut path between an ingress MPC and an egress MPC.
Figure 13:
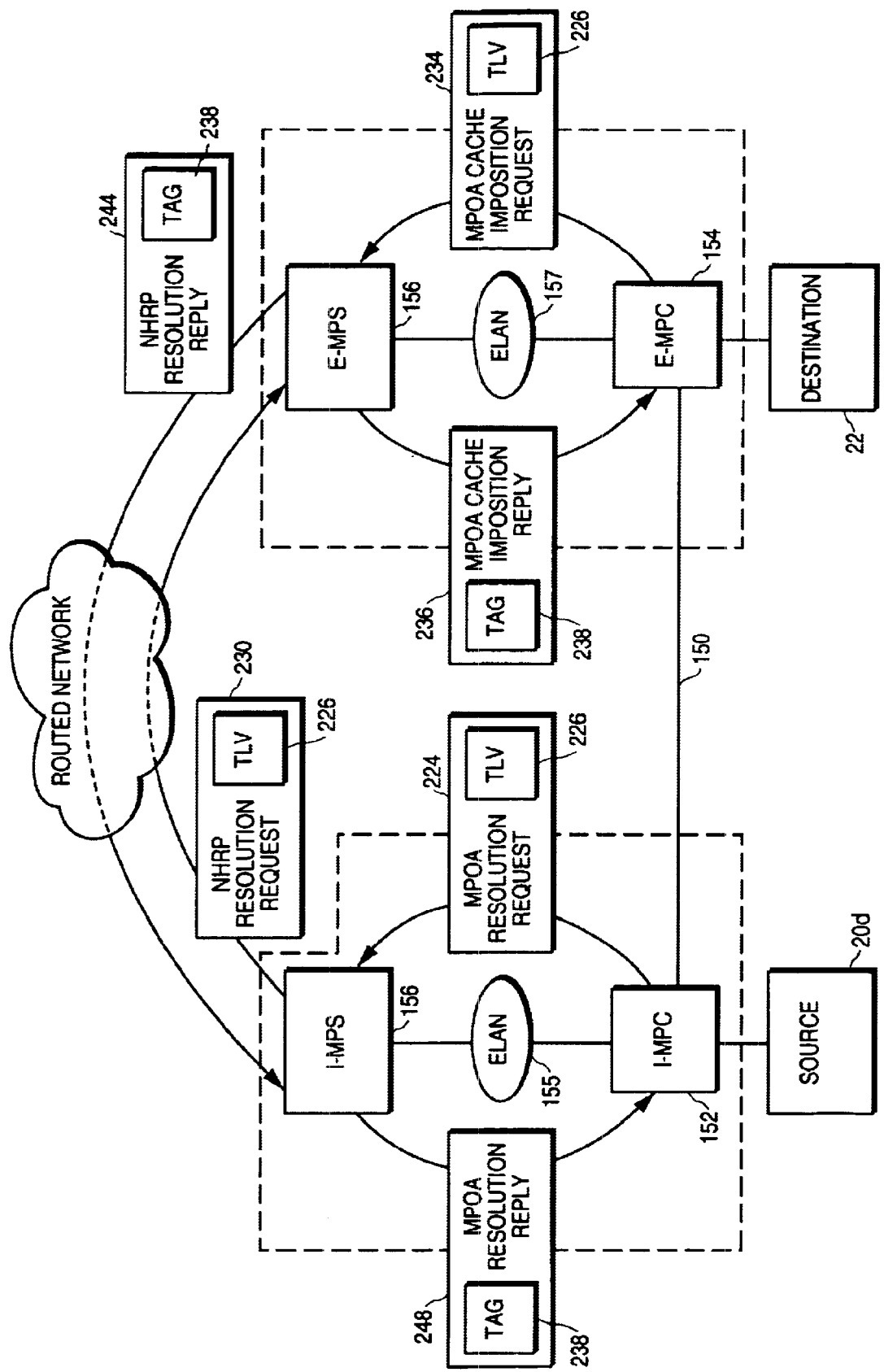
FIG. 13 is a diagrammatic representation of an exemplary network, showing the exchange of messages as detailed in the flow chart illustrated in FIG. 12.

Turning first to FIG. 12, there is shown a flow chart illustrating a method 204 of setting up a MPOA short-cut path between the ingress MPC 152 and the egress MPC 154. The method 204 is typically performed in response to the ingress MPC 152 seeing a large number of messages targeting a specific IP address. The method 204 commences at step 220, and then proceeds to step 222, where the ingress MPC 152 issues a MPOA Resolution request 226 including a Type-Link-Value encoding (TLV) 226, as illustrated in FIG. 13, to the ingress MPS 156. At step 224, the ingress MPS 156 translates the MPOA Resolution Request 224 into a NHRP Resolution Request 230, also including the TLV 236, and issues the NHRP Resolution Request 230 to the egress MPS 158. At step 232, the egress MPS 158 translates the NHRP Resolution Request 230 to a MPOA Cache Imposition Request 234, again including the TLV 226, which is issued to the egress MPC 154. After implementing the cache imposition, the egress MPC 154 responds by issuing a MPOA Cache Imposition Reply 236, including a tag 238, to the egress MPS 158 at step 240. The tag 238 is a 32-bit value that the egress MPC 154 provides to the ingress MPC 152 for inclusion in MPOA packet headers for packets sent from the ingress MPC 152. At step 242, the egress MPS 158 translates the MPOA Cache Imposition Reply 236 into a NHRP Resolution Reply 244, including the tag 238, which is then issued to the ingress MPS 156. At step 246, the ingress MPS translates the NHRP Resolution Reply 244 into a MPOA Resolution Reply 248, including the tag 238, which is issued to the ingress MPC 152. At step 250, the ingress MPC prepares to transmit over the MPOA short-cut path 150, the egress MPC 154 prepares to receive over the MPOA short-cut path 150. The method 204 then terminates at step 252. RSVP short-cuts, on the other hand, may be triggered when a RESV message arrives at the ingress MPS 156 and matches a PATH state received from the ingress MPC 152. A RSVP policy task at he ingress MPS 156, if it accepts the need for this QoS request, can use a RSVP short-cut as one way of servicing this request. Another method is for the ingress MPS 156 to be configured to look for PATH messages belonging to well-known flows and request a RSVP short-cut on them.

Figure 14:
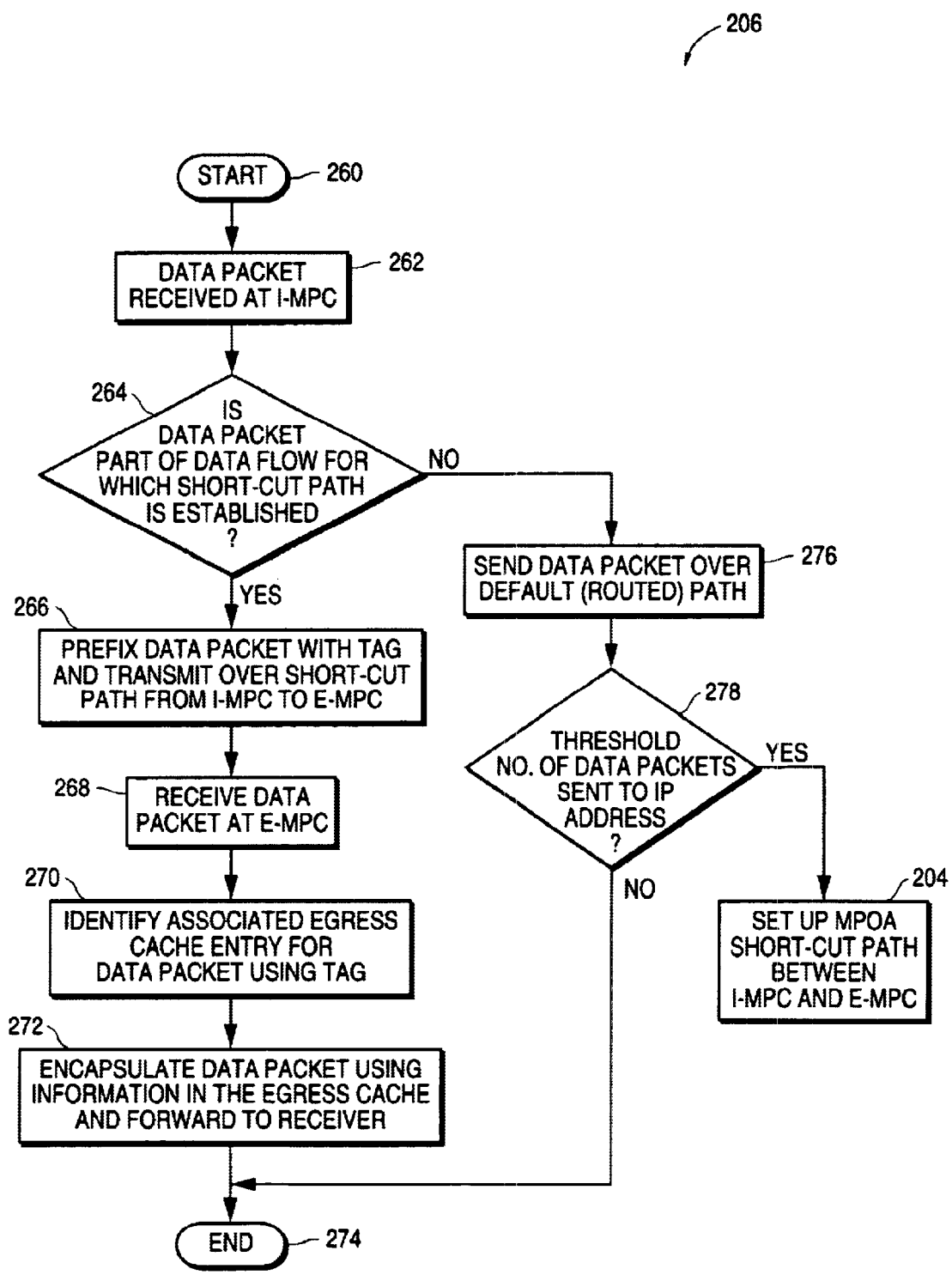
FIG. 14 is a flow chart illustrating a method, according to an exemplary embodiment of the present invention, of directing a data flow over a default MPOA short-cut path through a network.

FIG. 14 is a flow chart illustrating the method 206 of directing a data flow over a short-cut path, according to one embodiment of the present invention. The method 206 begins at step 260, then proceeds to step 262, where a data packet is received at the ingress MPC 152. At decision box 264, a determination is made as to whether the data packet is part of a data flow for which a short-cut path has been established. It should be noted that at any one time, the ingress MPC 152 might have three types of short-cut paths active, namely:

1. A default MPOA short-cut path whose egress side does not support RSVP short-cut paths. Any frame whose destination IP address matches the first N bits of the IP address associated with the default MPOA short-cut is sent on it. As mentioned above, this short-cut type is problematic in that PATH messages are accordingly not sent to the ingress MPS 156 for processing, so none of the bypassed routers on the ATM network will get QoS requests for a flow 2. A default MPOA short-cut path whose egress side does support RSVP short-cut paths. This short-cut path type is similar to the above, except that the MPC 152 is told that the egress node is RSVP-capable, and accordingly will forward all frames whose destination IP address matches the first N bits, except for RSVP messages that are instead sent to the ingress MPS 156.

3. A RSVP short-cut path. For this short-cut type, the destination IP address, the source IP address, the protocol, the destination port, and the source port are considered to determine whether the frame should be sent over the short-cut path.

The difference between the above short-cuts accordingly lies primarily in the manner in which frames are forwarded.

Short-cut path types (2) and (3) identified above are classified as RSVP-capable short-cuts, but differ in that the RSVP short-cut path (3) must match an RSVP session, including transport protocol and destination port as well as sender templates, while the MPOA short-cut path matches only the destination IP address.

Expanding further on the steps performed at decision box 264, the ingress MPC 152 compares the destination IP address of the data packet to IP addresses associated with extant short-cut paths. If the IP address matches only a short-cut path that is not RSVP-capable, it is sent on the shortcut. If it matches no short-cut at all, the data packet is forwarded on a routed path through the network. If the IP destination of the data packet does match a RSVP-capable short-cut path and the data packet has a protocol ID of RSVP, it is sent to the ingress MPS 156 without further processing. This can be done on a control connection to the ingress MPS 156, or on a LANE data-direct virtual channel (VC).

On the other hand, should the data packet not have a protocol ID of RSVP, a determination is made as to whether the destination IP address matches the RSVP short-cut path (3). If not, the data packet is sent on a default MPOA short-cut path. If there is a match, a determination is made as to whether the protocol ID, the source/destination IP address, or the source/destination ports match the RSVP short-cut path. If there is a match, the data packet is sent on the RSVP short-cut path. If not, the data frame is sent on an available MPOA short-cut path, or on the routed path, should no default MPOA short-cut path exist.

Returning again to FIG. 14 once it has been established at decision box 264 that the data packet is part of a data flow for which a short-cut path (e.g., either a default MPOA short-cut path or a RSVP short-cut path) has been established, the method 206 proceeds to step 266, where the data packet is prefixed with the tag 238, and transmitted over the short-cut path 150 from the ingress MPC 152 to the egress MPC 154. At step 268, the data packet is received at the egress MPC 154, and at step 270, an egress cache entry is identified for the data packet using the tag 238. At step 272, the data packet is encapsulated using information in the egress cache and forwarded to the receiver 22, whereafter the method 206 terminates at step 274.

Should it be determined at decision box 264 that no short-cut path exists for the data packet, the data packet is sent on a routed path, as shown at step 276. At step 278, a determination is made as to whether a threshold number of data packets have been targeted at a specific IP address within a predetermined time. If not, the method again terminates at step 274. However, if the condition of decision box 278 is met, the method 206 proceeds to the method 204, described with reference to FIG. 12, to set up a short-cut path between the ingress MPC 152 and the egress MPC 154.

Figure 15:
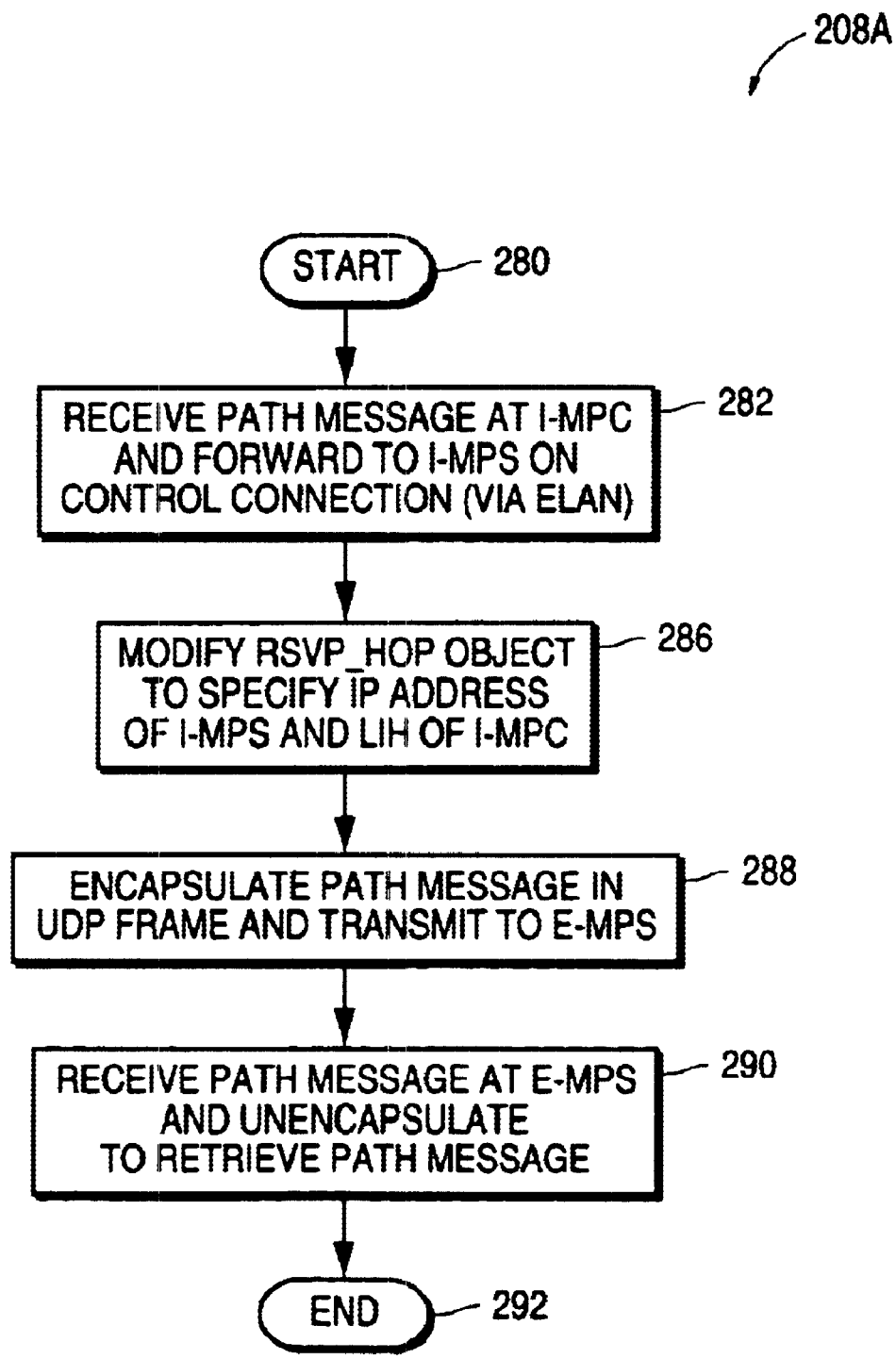
FIG. 15 is a flow chart illustrating a method, according to an exemplary embodiment of the invention, of directing a control flow over a routed path through a UDP tunnel.

FIG. 15 is a block diagram illustrating a method 208A, according to an exemplary embodiment of the present invention, of directing a control flow over a routed path through a UDP tunnel. The method 208 commences at step 280, and proceeds to step 282, where a PATH message is received at the ingress MPC 152 from the source 20D, as illustrated at 284 in FIG. 8. The ingress MPC 152 forwards the PATH message to the ingress MPS 156 via the MPC-MPS control connection. At step 286, the ingress MPS 156 modifies a RSVP_HOP object 192 included within the PATH message 190 to specify the IP address of the ingress MPS 156 and the LIH of the ingress MPC 152. This is significant in that a RESV message generated by the destination 22 will be returned to this IP address, while resources will be reserved with respect to the interface (e.g., the ingress MPC) identified by the LIH.

At step 288, the ingress MPS 156 encapsulates the PATH message in a UDP frame and transmits the encapsulated path message to the egress MPS 158. Specifically, the ingress MPS attaches a UDP header to the PATH message, this UDP header including IP address for the egress MPS 158. This encapsulation of the PATH message, according to one embodiment of the present invention, is viewed as creating a UDP tunnel between the ingress MPS 156 and the egress MPS 158 through which PATH messages may be sent without dropping state at any intermediate RSVP nodes between the ingress and egress MPSs 156 and 158.

At step 290, the egress MPS 158 receives the UDP encapsulated PATH message and proceeds to unencapsulate the received message to retrieve the original PATH message. The unencapsulated path message is then forwarded to the destination 22 and the method 208 then terminates at step 292.

Figure 16:
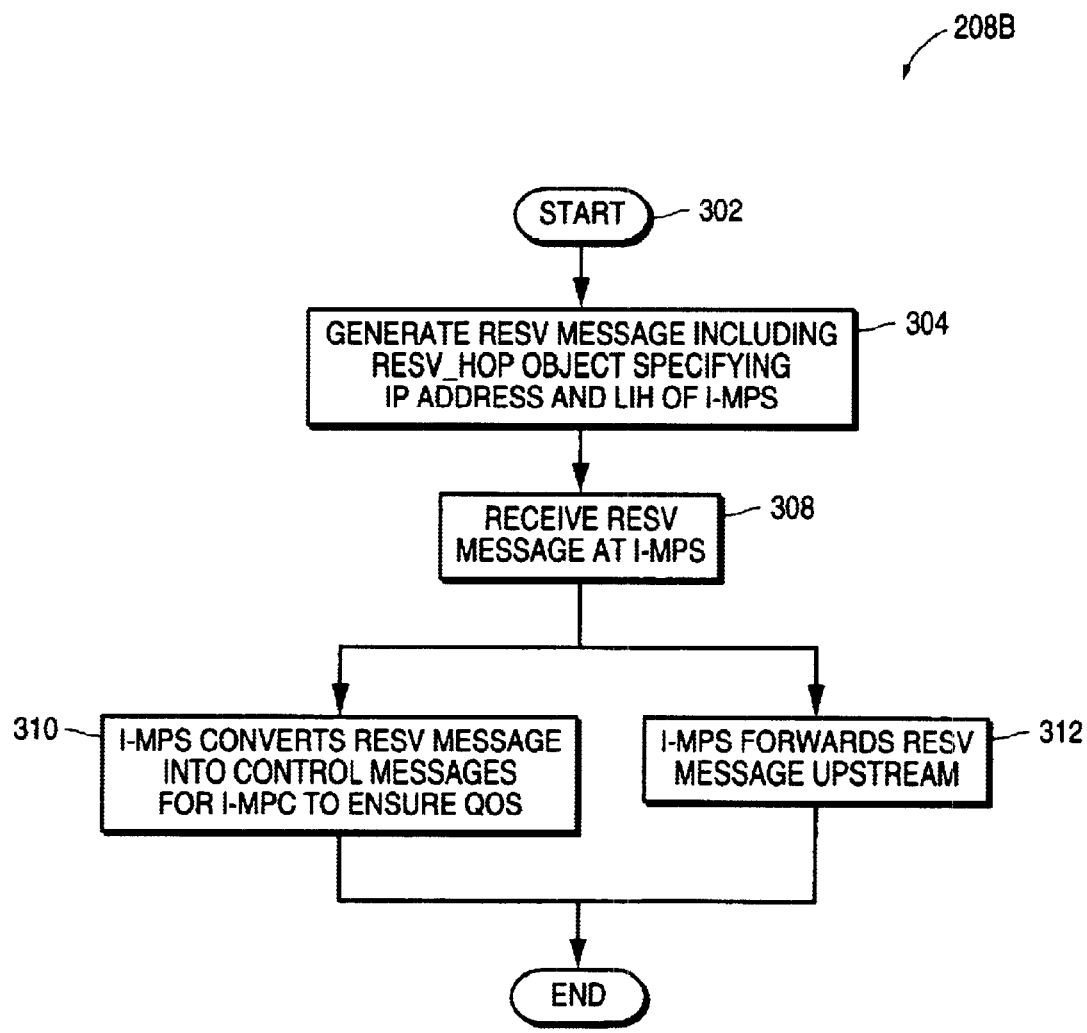
FIG. 16 is a flow chart illustrating a method, according to an exemplary embodiment of the present invention, of propagating a return control flow over a routed path through a network.

FIG. 16 is a flow chart illustrating a method 208B, according to an exemplary embodiment of the present invention, of propagating a return control flow over a routed path through a network. The method 300 commences at step 302, and proceeds to steps 304 wherein the destination 22 generates a RESV message, responsive to a received PATH message, the RESV message including a RSVP_HOP object 196 specifying the IP address 78 of the sending interface, and the LIH 80 of the ingress MPS 156. Further, the RESV message will have a destination IP address 66 (included in the IP header) corresponding to the IP address 78 specified in the RSVP_HOP object 192 of the corresponding PATH message (i.e., the IP address of the ingress MPS 156).

The reverse path taken by the RESV message need not be symmetric, and the RESV message may or may not pass through the egress MPC or egress MPS. As the RESV message has the IP address of the ingress MPS 156 as its destination address it will only be interpreted by this device. At step 308, the RESV message is received at the ingress MPS 156, whereafter two operations with respect to the RESV message occur. Firstly, as indicated at step 310, the ingress MPS 156 converts the RESV message into a number of control messages that are propagated to the ingress MPC 152 to ensure QoS for the short-cut path between the ingress MPC 152 and the egress MPC 154 over which the associated data flow is being directed. These control messages may be propagated to the ingress MPC 152 either via a control connection or via the ELAN 155. Exemplary messages include:

TABLE 1

| MESSAGE | DIRECTION | USE |
| --- | --- | --- |
| Su | i-MPC to I-MPS | Short-cut up |
| Sd | i-MPC to I-MPS | Short-cut down |
| St | i-MPS to I-MPC | Return the short-cut state (either Su or Sd) |
| As | i-MPS to I-MPC | Add list of senders allowed to use the short-cut |
| Ds | i-MPS to I-MPC | Drop list of senders allowed to use short-cut |
| Ud | i-MPS to I-MPC | UDP tunnel failed |

All of the above messages further have acknowledgement messages in the reverse direction, except for Su, Sd, St.

At step 312, the ingress MPS 156 also forwards the received RESV message upstream to the source 22D, so that any further resources that require reservation upstream may be properly reserved.

Finally, in one embodiment of the present invention Time To Live (TTL) may be utilized by the RSVP protocol to detect a break in the QoS path. For example, the IP_TTL, which is located in the IP header and is decremented at every IP router on a path, may be utilized in conjunction the RSVP_TTL, which is located in the RSVP header and is decremented at each RSVP router on a path. If a RSVP router received a PATH message and determines that the IP_TTL is less than the RSV_TTL, it will be apparent that there was a non-RSVP router in the path (i.e., the QoS is broken). Specifically, the UDP tunnel must ensure that the IP_TTL and RSVP_TTL values are decremented by the same value when a PATH message is sent from the ingress MPS 156 to the egress MPS 158. This requires collecting, in the RSVP TLV during short-cut setup, the amounts by which the ingress MPC 152 will decrement the data packets to make the PATH and data IP_TTL consistent, and the amount by which the egress MPS 158 will decrement the IP_TTL when forwarding the PATH from the UDP tunnel. The ingress MPS 152 then decrements the IP_TTL by (I-MPC_TTL_decrement—e-MPS_TTL_decrement), and decrements RSVP_TTL by I-MPC_TTL_decrement.

The present invention is advantageous in that it proposes a mechanism by which the scalability of RSVP may be maintained within a large network through which short-cut paths may be implemented. The invention further does not require the establishment of a dedicated VCC, or short-cut path, to carry a control flow associated with a data flow on a parallel short-cut path. The avoidance of this dedicated and parallel VCC is advantageous in that it does not negatively impact the future extension of RSVP with respect to point-to-multipoint ATM short-cuts. Further, the avoidance of a parallel VCC avoids the need to tear down the data short-cut path when the control short-cut path is down.

The present invention also facilitates full QoS through an ATM network even if only the routers at the edge of the ATM network support RSVP, and it is accordingly not necessary that interior routers have this capability.

Any one of the methods discussed above may be performed by a machine, such as a computer, router, switch or routing switch, under control of a sequence of instructions that, when executed by the machine, cause the machine to perform the above described methods. The sequence of instructions may be embodied within the ingress MPS 156, a RSVP process, the ingress MPC 152, the egress MPS 158 or the egress MPC 154, and may be stored on a machine-readable medium such as, for example, a magnetic storage medium, an optical storage medium, or a Random Access Memory (RAM), or even embodied within a carrier-wave (which shall be taken to fall within the scope of the term "machine-readable medium".)

Alternative Embodiments

Figure 17:
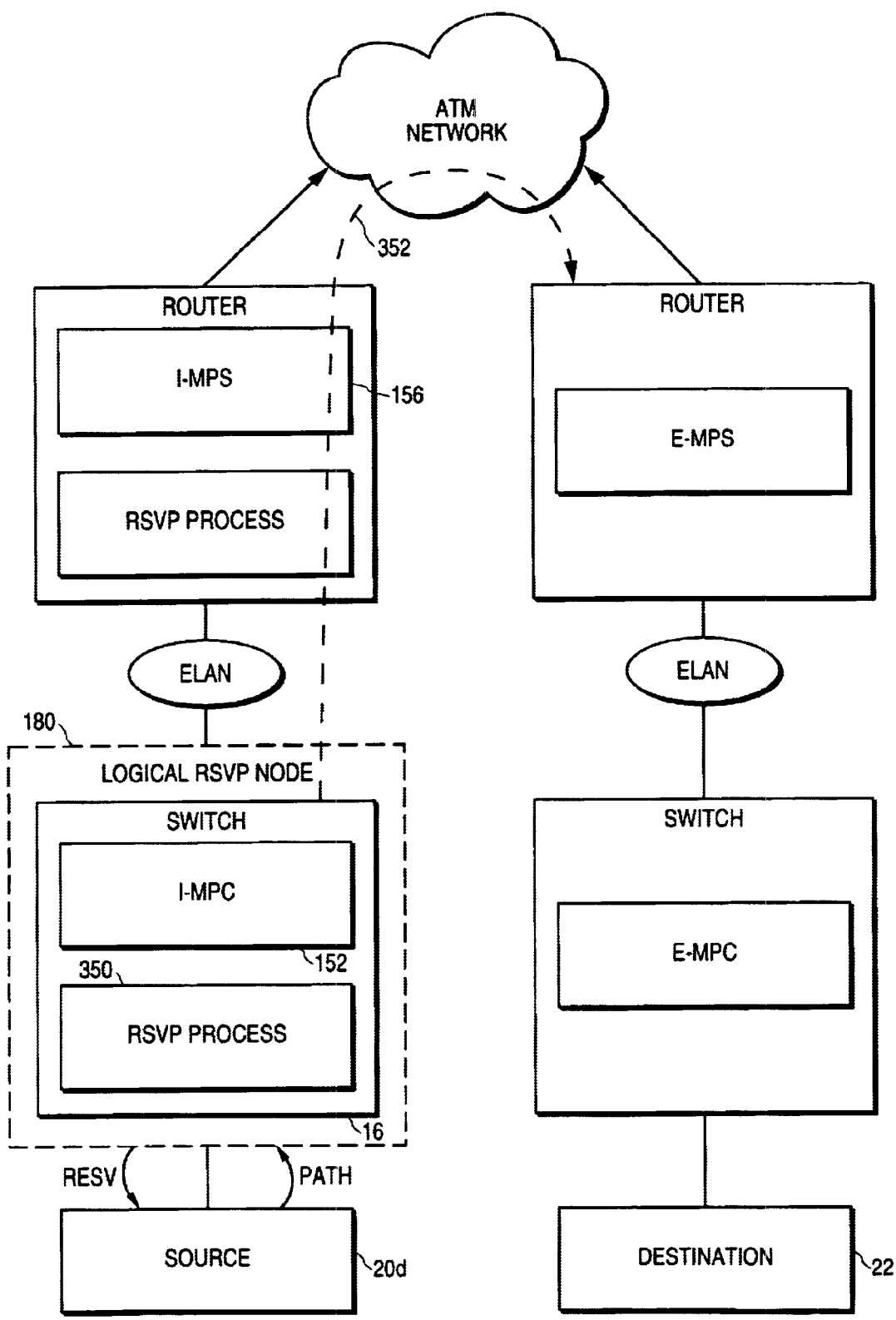
FIG. 17 is a block diagram illustrating an alternative embodiment of a network, according to the present invention, within which a logical RSVP node is implemented

FIG. 17 illustrates an alternative embodiment of the present invention, wherein the logical RSVP node 180 is implemented entirely within a single device, such as the switch 16. The switch 16 may in this case comprise a so-called "routing switch" such as the Accelar™ 1000 series of routing switches manufactured by Bay Networks, Inc. of Santa Clara, Calif. In this embodiment, it will be noted that the switch 16 hosts a RSVP process 350, and accordingly has RSVP functionality. Accordingly, the embodiment of the invention illustrated in FIG. 17 allows a PATH message received from the source 20D to be processed and encapsulated, as described above, within the switch 16, and propagated via a UDP tunnel 352 directly from the switch 16. In this case, it will be appreciated that the RSVP_HOP object included within the path message will identify both the IP address and the LIH of the ingress MPC 152.

Similarly, when a RESV message is received at the switch 16, it is processed in the manner described above by the ingress MPC 152, and accordingly no control messages need to be generated by the ingress MPS 156. Nonetheless, the ingress MPC 152 will still issue ATM address resolution requests to the ingress MPS 156, and other functioning between the MPC and the MPS will be unaffected.

In summary, by implementing RSVP functionality on the device hosting the ingress MPC 152, the ingress MPS 156 can be bypassed with respect to the control flow.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Thus, a method of implementing QoS data communications over a short-cut path through a routed network has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of establishing quality-of-service communications within a network, the method including:
    constructing an ingress device as a logical RSVP node comprising an ingress MPOA client (I-MPC) and an ingress MPOA server (I-MPS);
    establishing a short-cut path through the network between the ingress device and an egress device;
    propagating a data flow between the ingress and egress devices over the short-cut path;
    encapsulating a control flow, associated with the data flow and facilitating the quality-of-service data communications, within a protocol not supporting quality-of-service; and
    propagating the encapsulated control flow from the ingress device to the egress device over a routed path through the network,
    wherein the control flow includes a RSVP PATH message specifying an IP address corresponding to the I-MPS and a Logical Interface Handle (LIH) corresponding to the I-MPC.

2. The method of claim 1 including unencapsulating the encapsulated control flow at the egress device to reveal the control flow.

3. The method of claim 1 wherein the control flow conforms to the RSVP protocol.

4. The method of claim 1 wherein the protocol not supporting quality-of-service is the User Datagram Protocol (UDP) or the Transmission Control Protocol (TCP).

5. The method of claim 1 wherein the establishing of the short-cut path comprises establishing an asynchronous transfer mode (ATM) virtual channel (VC) between the ingress and egress devices.

6. The method of claim 1 wherein the short-cut path is established using the Multi-Protocol Over ATM (MPOA) protocol.

7. The method of claim 1 wherein the short-cut path is established using the Next Hop Resolution Protocol (NHRP).

8. The method of claim 1 including constructing the egress device as a logical RSVP node comprising an egress MPOA client (E-MPC) and an egress MPOA server (E-MPS).

9. The method of claim 1 wherein a RSVP_HOP object is included within the RSVP PATH message specifying the IP address corresponding to the I-MPS and the Logical Interface Handle (LIH) corresponding the I-MPC.

10. A method of performing communications within a network including an ingress node and an egress node, the method including:
    constructing the ingress node as a logical RSVP node comprising an ingress MPOA client (I-MPC) and an ingress MPOA server (I-MPS);
    propagating a data message over a short-cut path established between the ingress and egress nodes;

encapsulating a control message, associated with the data message and conforming to a first protocol, according to a second protocol that does not reserve resources at intermediate network nodes within the network; and propagating the encapsulated control message from the ingress device to the egress device over a routed path through the network;

wherein the control message comprises a RSVP PATH message specifying an IP address corresponding to the I-MPS and a Logical Interface Handle (LIH) corresponding to the I-MPC.

11. The method of claim 10 including unencapsulating the encapsulated control message at the egress node to reveal the control message.

12. The method of claim 10 including reserving resources at the ingress node responsive to the control message.

13. The method of claim 10 wherein the control message specifies a quality-of-service.

14. The method of claim 10 wherein the control message conforms to the RSVP protocol.

15. The method of claim 10 wherein the second protocol is the User Data Protocol (UDP).

16. The method of claim 10 including establishing the short-cut path over an asynchronous transfer mode (ATM) virtual channel (VC) between the ingress and egress nodes.

17. The method of claim 10 including establishing the short-cut path using the Multi-Protocol Over ATM (MPOA) protocol.

18. The method of claim 10 ncluding establishing the short-cut path using the Next Hop Resolution Protocol (NHRP).

19. The method of claim 10 including constructing the egress node as a logical RSVP node comprising an egress MPOA client (E-MPC) and an egress MPOA server (E-MPS).

20. The method of claim 10 wherein a RSVP_HOP object is included within the RSVP PATH message specifying the IP address corresponding to the I-MPS and the Logical Interface Handle (LIH) corresponding to the I-MPC.

21. A method of establishing a quality-of-service connection between an ingress node and an egress node within a network, the method including:

constructing the ingress node as a virtual router comprising:
 (1) a client comprising an end-point of a short-cut path between the ingress node and the egress node; and
 (2) a server implementing a quality-of-service protocol; and issuing a first quality-of-service control message from the virtual router identifying the client as the end-point of the shortcut and the server as implementing the quality-of-service protocol.

22. The method of claim 21 including receiving a second quality-of-service control message at the virtual router in response to the first quality-of-service control message, and issuing a third control message from the server to the client in response to the second quality-of-service control message.

23. The method of claim 21 wherein the quality-of-service protocol is the Resource ReSerVation Protocol (RSVP).

24. Apparatus for establishing quality-of-service communications within a network, the apparatus including:

a port to receive a data flow and a control flow, the control flow facilitating quality-of-service for the data flow; and a logical node to encapsulate the control flow according to a protocol not implementing resource reservation, and to propagate the data flow via a short-cut path and the encapsulated control flow via a routed path through the network, wherein the logical node comprises (1) a logical router hosting a RSVP process and a MPOA server and a switch hosting a MPOA client or (2) a switching router hosting a RSVP process and a MPOA client.

25. The apparatus of claim 24 wherein the apparatus comprises a switching system product.

26. The apparatus of claim 24 wherein the apparatus comprises a transmission systems product.

27. Apparatus for establishing quality-of-service communications within a network, the apparatus including:

means for receiving a data flow and a control flow, the control flow facilitating quality-of-service for the data flow; and means for encapsulating the control flow according to a protocol not implementing resource reservation, and for propagating the data flow via a short-cut path and the encapsulated control flow via a routed path through the network, wherein the means for encapsulating comprises (1) a logical router hosting a RSVP process and a MPOA server and a switch hosting a MPOA client, or (2) a switching router hosting a RSVP process and a MPOA client.

28. The apparatus of claim 27 wherein the apparatus comprises a switching system product.

29. The apparatus of claim 27 wherein the apparatus comprises a transmission systems product.

30. A machine readable medium storing a plurality of instructions that, when executed by machine by a network, cause the machine to:

construct an ingress node as a virtual router comprising a client to operate as an end-point of a short-cut path between the ingress node and an egress node, and a server implementing a quality-of-service protocol; and issue a quality-of-service control message from the virtual router identifying the client as the end-point of the short-cut path and the server as implementing the quality-of-service protocol.

* * * * *